US005822525A

United States Patent [19]

Tafoya et al.

[11] Patent Number: 5,822,525
[45] Date of Patent: Oct. 13, 1998

[54] METHOD AND SYSTEM FOR PRESENTATION CONFERENCING

[75] Inventors: John E. Tafoya, Santa Clara; Robert L. C. Parker, Cupertino, both of Calif.

[73] Assignee: Microsoft Corporation, Redmond, Wash.

[21] Appl. No.: 651,779

[22] Filed: May 22, 1996

[51] Int. Cl.$^6$ .................................................. G06F 15/16
[52] U.S. Cl. .................. 395/200.34; 395/200.33; 395/200.35; 395/200.38; 395/200.78; 345/330; 345/331; 345/329; 370/260; 370/270
[58] Field of Search ............................ 395/200.3–200.34, 395/200.35, 329–331, 335, 339, 971–972, 200.78, 200.38; 364/242.4, 242.6, 242.94, 242.96, 284.4; 370/260, 270

[56] References Cited

U.S. PATENT DOCUMENTS

| | | | |
|---|---|---|---|
| 5,204,768 | 4/1993 | Tsakiris et al. | 359/148 |
| 5,206,934 | 4/1993 | Naef, III | 395/200.34 |
| 5,303,042 | 4/1994 | Lewis et al. | 348/14 |
| 5,392,400 | 2/1995 | Berkowitz et al. | 395/200.33 |
| 5,465,370 | 11/1995 | Ito et al. | 395/200.34 |
| 5,524,199 | 6/1996 | Orton et al. | 395/340 |
| 5,583,993 | 12/1996 | Foster et al. | 395/200.35 |
| 5,608,872 | 3/1997 | Schwartz et al. | 395/200.35 |
| 5,617,539 | 4/1997 | Ludwig et al. | 395/200.35 |
| 5,634,018 | 5/1997 | Tanikoshi et al. | 395/329 |

OTHER PUBLICATIONS

Schroeder, Erica "PictureTel Plans Low–Cost Video App Sharing," *PCWEEK*, vol. 11, No. 25, Jun. 27, 1994, pp. 1 and 171.

Schroeder, Erica, "Creative Brings Mac Package to Windows," *PCWEEK*, vol. 11, No. 25, Jun. 27, 1994, pp. 83 and 88.

"Intel ProShare™ Personal Conferencing Software," Intel Corporation, 1994, pp. 25–31.

*Harvard Spotlight for Windows™*, Software Publishing Corporation, Santa Clara, California, 10 pages, 1994.

*Harvard Spotlight–The Presenter's Ultimate Control Panel*, Software Publishing Corporation, 8 pages, Online, Available HTTP: http://www.spco.com/products/spotlite, May 16, 1996..

*Primary Examiner*—Emanuel Todd Volltz
*Assistant Examiner*—Tuan Q. Dam
*Attorney, Agent, or Firm*—Seedand Berry, LLP

[57] ABSTRACT

A presentation system for displaying a presentation at multiple computer systems. One computer system is designated as a presenter computer system, and the other computer systems are designated as audience member computer systems. Each computer system executes an application that exposes a function for controlling the behavior of the application. Each computer system also has a conference subsystem with a messaging component, an automation component, and a user interface component. The messaging component controls communications between the computer systems. The automation component controls the behavior of the application using the exposed function. The user interface component displays the presentation within a conference window, receives commands from a presenter and sends the commands to each audience member computer system, receives commands from the presenter computer system, and directs the automation component to effect the performing of behavior of the received commands.

30 Claims, 44 Drawing Sheets

METHOD AND SYSTEM FOR PRESENTATION CONFERENCING

TECHNICAL FIELD

The present invention relates generally to a computer method and system for presentations and, more specifically, to a method and system for conferencing a presentation for multiple computer systems.

BACKGROUND OF THE INVENTION

Computer systems have been used to prepare and display various types of presentations. For example, applications have been developed to help a presenter prepare slides for a presentation. These slides can either be printed for projection or directly displayed on a large monitor. When displayed on a monitor, the application can control the timing and sequencing of the presentation. However, each audience member must be in the same room as the presenter to view the presentation.

Application sharing systems have been developed that allow the output of one computer program to be displayed at multiple computer systems. Thus, with such application sharing systems, a presentation could be displayed to several "audience members" who are located at remote computer systems. However, such application sharing systems typically have an extremely high overhead. For example, the bitmap image, which can be very large, of each display is sent to each audience member. The transfer of such large amounts of data can take a considerable amount of time, especially if transferred through modem and telephone lines. Thus, there may be a considerable delay from when the presenter indicates to go to the next slide until all the audience members actually see the image of that slide. Also, the display sizes at the computer systems vary and thus complicated scaling or scrolling of the bitmap is typically needed. It would be desirable to have a presentation system that avoids these overheads.

SUMMARY OF THE INVENTION

The present invention provides a presentation method and system for simultaneously displaying a presentation at multiple computer systems. One computer system is designated as a presenter computer system, and the other computer systems are designated as audience member computer systems. At the presenter computer system, an instance of a presentation application designated to control the display of a presentation is executed. The application exposes a function for controlling behavior of the application and provides an option for indicating that a presentation is to be displayed simultaneously on multiple computer systems. The presenter computer system also has a conference subsystem. The conference subsystem has a messaging component, an automation component, and a user interface component. The messaging component sends commands to and receives commands from audience member computer systems. The automation component controls the behavior of the instance of application using the exposed function. The user interface component displays the presentation within a conference window, receives commands from a presenter, sends the commands to each audience member computer system, and directs the automation component to effect the performing of a behavior of the received commands. At each audience member computer system, an instance of the application program is also executed. Each audience member also has a conference subsystem with a messaging component, an automation component, and a user interface component. The messaging component sends commands to and receives commands from the presenter computer system. The automation component controls the behavior of the instance of application using the exposed function. The user interface component displays the presentation within a conference window, and directs the automation component to effect the performing of a behavior of the received commands.

Thus, the presenter's conference subsystem receives commands from the presenter and directs its instance of the application to perform the command. The presenter's conference subsystem also sends the commands to the audience member computer system. The audience member's conference subsystem receives the commands and directs its instance of the application to perform the command. In this way, each computer system executes the same command to effect simultaneous display of the presentation.

BRIEF DESCRIPTION OF THE DRAWINGS

FIGS. 1A–1J show a sample presentation.

DETAILED DESCRIPTION OF THE INVENTION

Figure 1A:
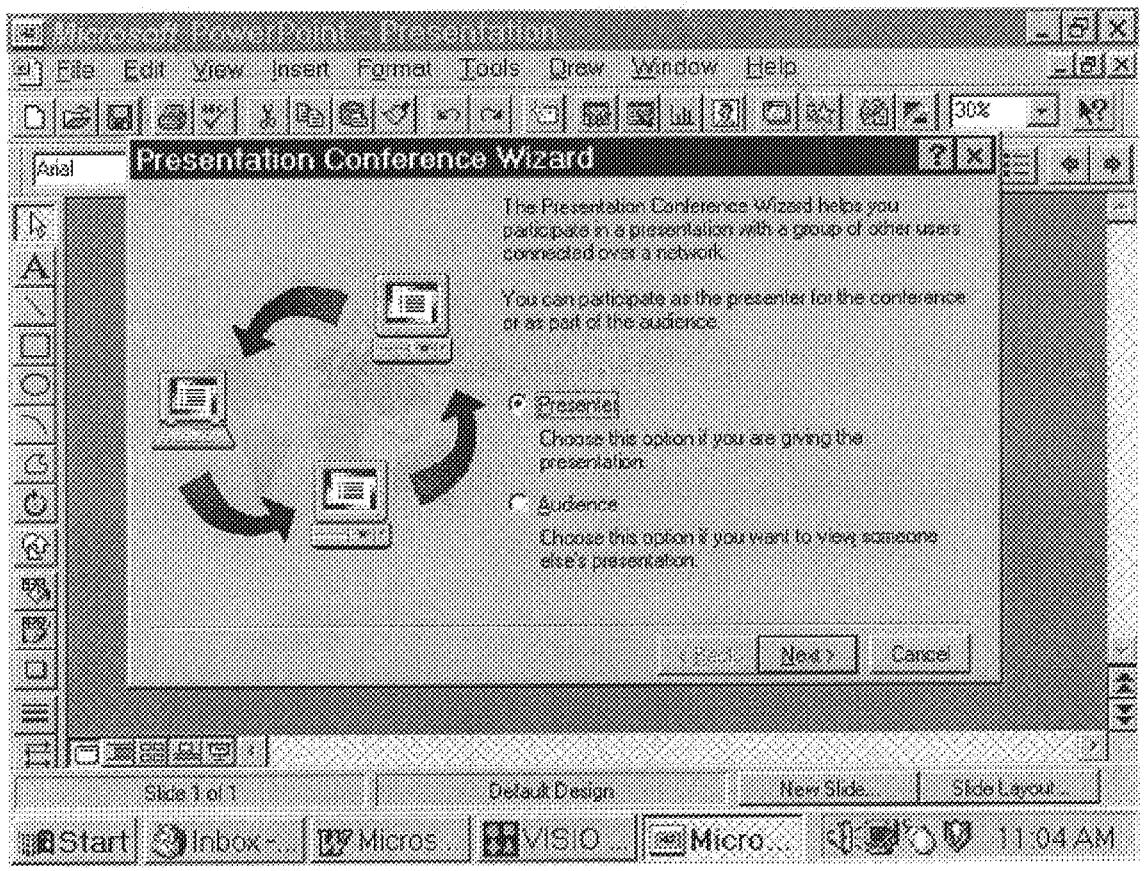

The present invention is directed to a method and system for presentation conferencing. In a preferred embodiment, a presentation is conducted by starting an instance of the presentation application at each conference computer system. The presentation conferencing system establishes a connection between the presenter computer system and each audience member computer system. The presenter computer system then transfers a file containing a description of the presentation to each audience member computer system. The presenter computer system receives commands from the presenter to control the presentation. The presenter computer system sends each of these commands to the audience member computer system. Each audience member computer system directs its presentation application to perform each command. In this way, each audience member can view the presentation as it is conducted.

In a preferred embodiment, a presentation application interfaces with a conference subsystem to support the conducting of a conference. The presentation application provides an option for conducting a conference with a presentation. When this option is selected, the presentation application starts a conference wizard that initializes the conference. The conference wizard invokes the services provided by the conference subsystem. The conference wizard provides a user interface for determining whether a conferee is the presenter or an audience member. If the conferee is the presenter, the conference wizard prompts the user for the identification of the audience members. Once the audience members are identified, the conference wizard launches a status dialog to notify the presenter that a connection is being established with the audience members. The conference subsystem then establishes a connection with each audience member. When the connections are established, the conference subsystem sends a presentation file containing the presentation and a command to start the presentation to each audience member. The conference subsystem then displays a conference window for display of the presentation. The presenter then selects commands (e.g., go to next slide) through the conference window to conduct the presentation. The conference window passes the commands to the conference subsystem, which directs the presentation application to perform that command at the presenter and sends that command to each audience member.

To participate in the conference, each audience member starts the presentation application and selects the conferencing option. In response, the presentation application starts a conference wizard. The conference wizard provides a user interface for determining whether a conferee is the presenter or an audience member. If the conferee is an audience member, then when the connection with the presenter is established, the conference subsystem of the audience member receives and stores the conference file. When the conference subsystem receives the command to start the presentation, the conference subsystem directs the presentation application to display a conference window and start the presentation. When the conference subsystem receives subsequent commands from the presenter, it directs the presentation application to perform the commands to effect the display of the presentation.

Thus, each conferee executes the presentation application and receives a copy of the presentation. The presenter sends commands to each audience member. When a command is received, the conference subsystem directs the presentation application to perform the command and sends a response to the presenter indicating that the command was performed successfully. Thus, the presentation is synchronized with all conferees. The computations needed to display the presentation are performed by each audience member. Thus, the transferring of bitmap images of displays is avoided. Also, an audience member can leave the presentation without affecting the other conferees.

Figure 1B:
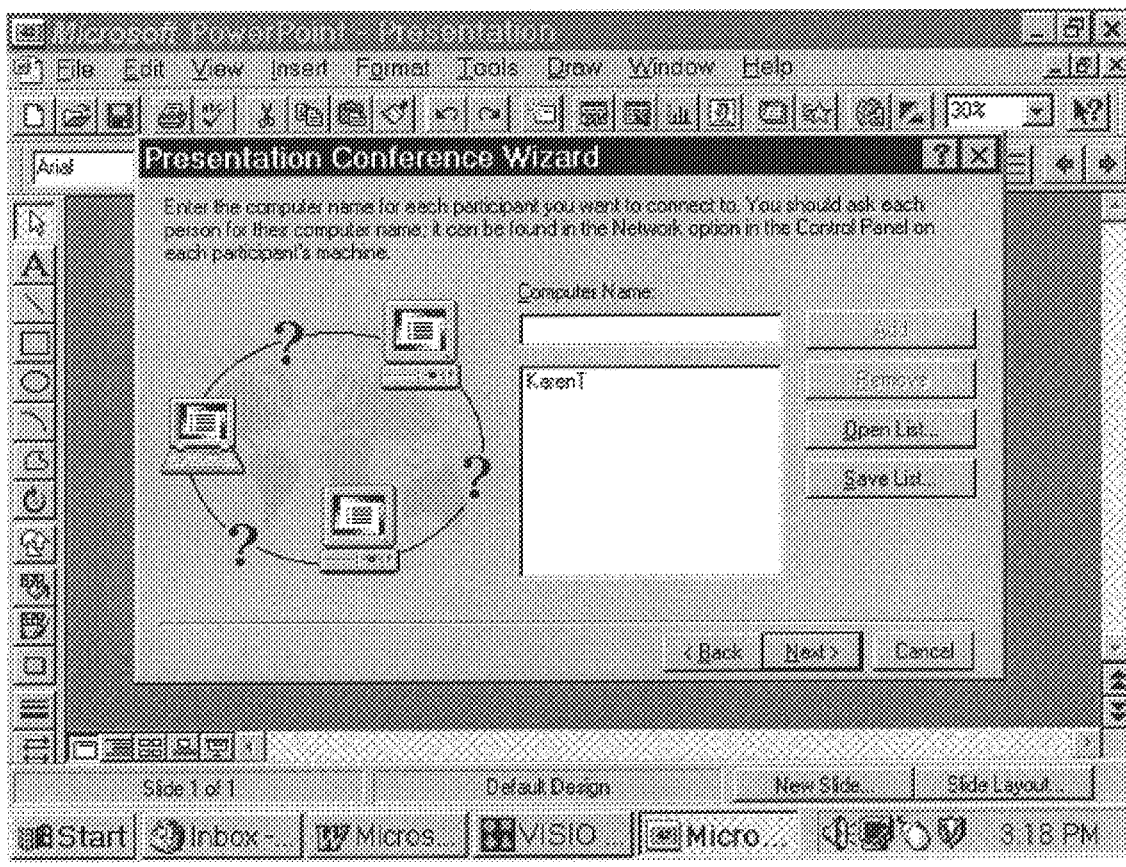
Figure 1C:
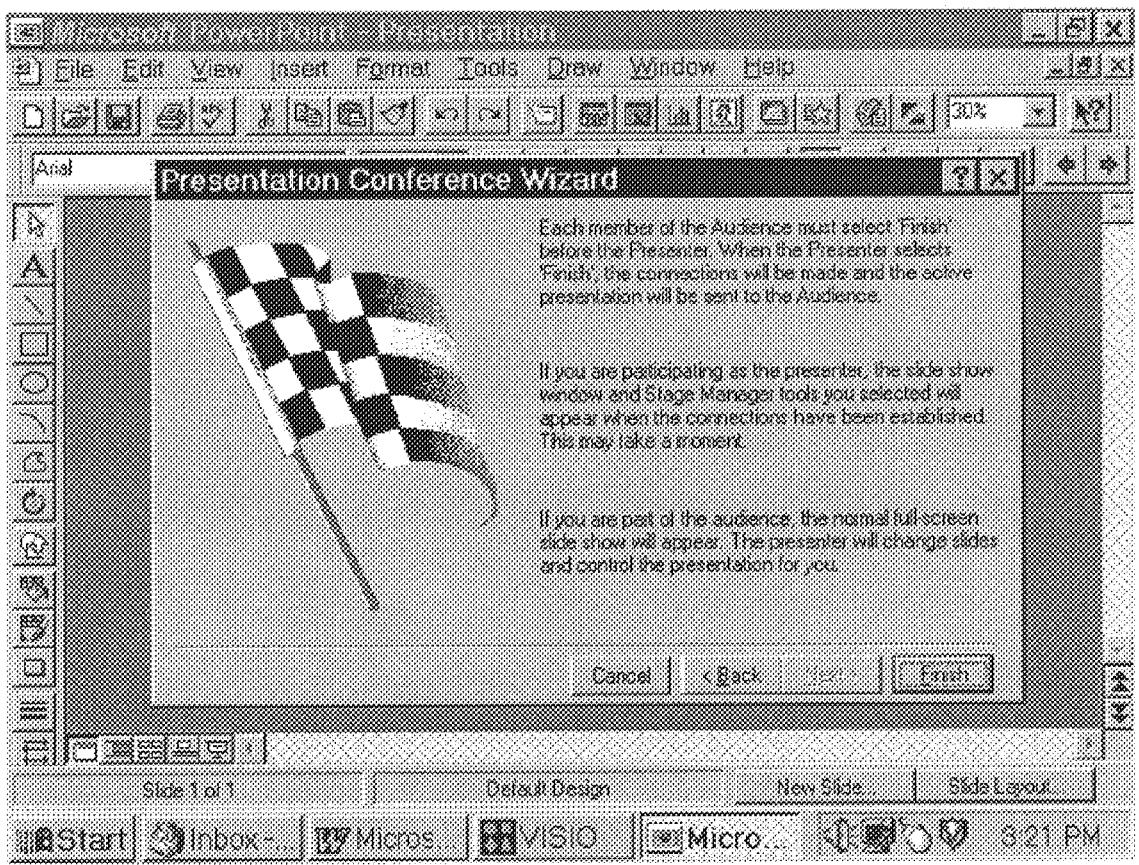

FIGS. 1A–1J show the user interface of a sample presentation in a slide show presentation application. FIG. 1A shows the first window displayed by the conference wizard. Using this window, the conference wizard inputs the selection as to whether the conferee is a presenter or an audience member. FIG. 1B shows the window for inputting the names of the audience members. The conference wizard displays this window to the presenter who inputs the computer names of the audience members. FIG. 1C shows the final window of the conference wizard. The conference wizard displays this window for each conferee. After all the audience members select finish, the presenter then selects finish and the presentation begins with the currently active presentation of the presenter's presentation application.

Figure 1D:
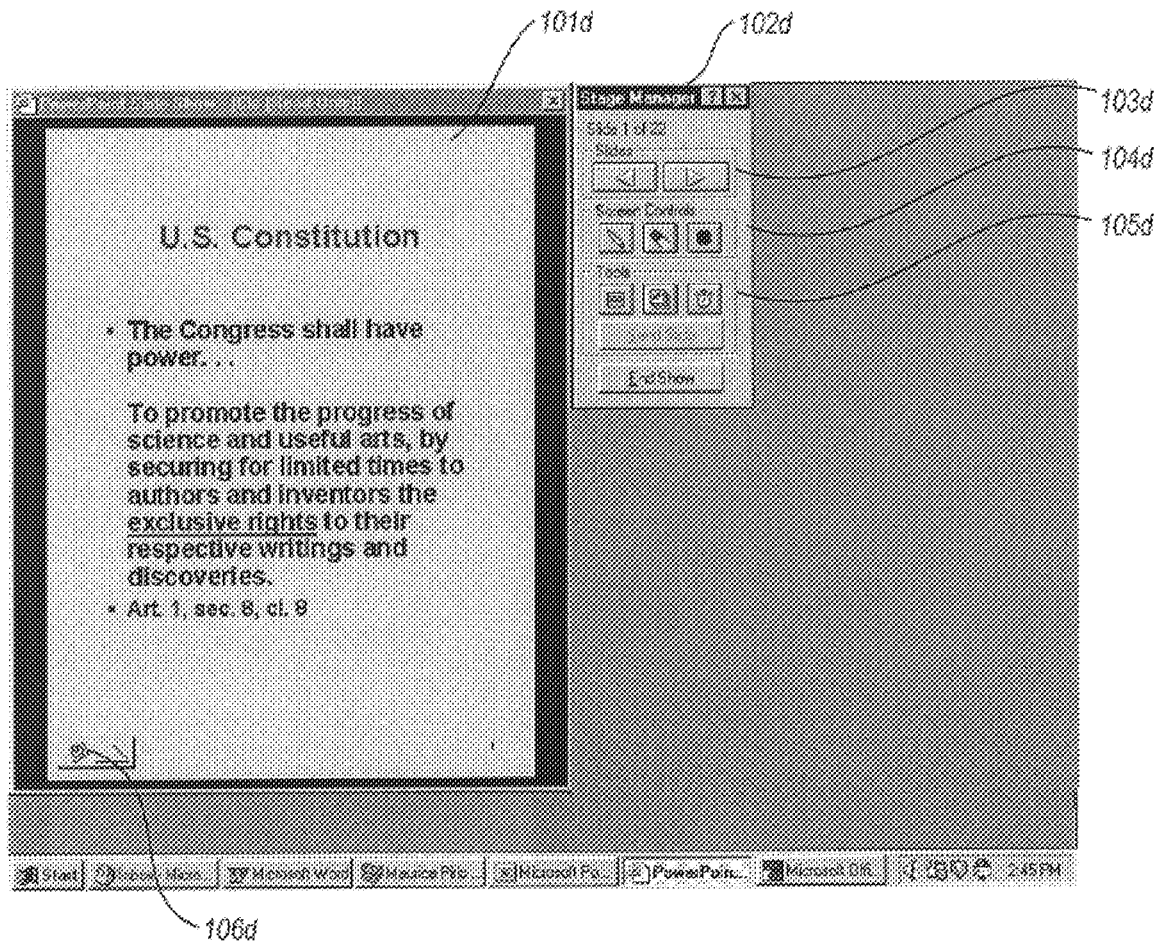

FIG. 1D shows the conference window of the presenter. The presentation is displayed in the presentation window 1D01, and the presentation controls are displayed in the stage manager window 1D02. The presentation controls allow the presenter to select the next or previous slide using buttons 1D03, to select a draw mode using buttons 1D04 for drawing on the presentation and to select various other options 1D05. The conference window also includes a button 1D06 for selecting a pop-up menu that allows a user to select various options, such as displaying a specific slide by number and setting the color for the drawing mode.

Figure 1E:
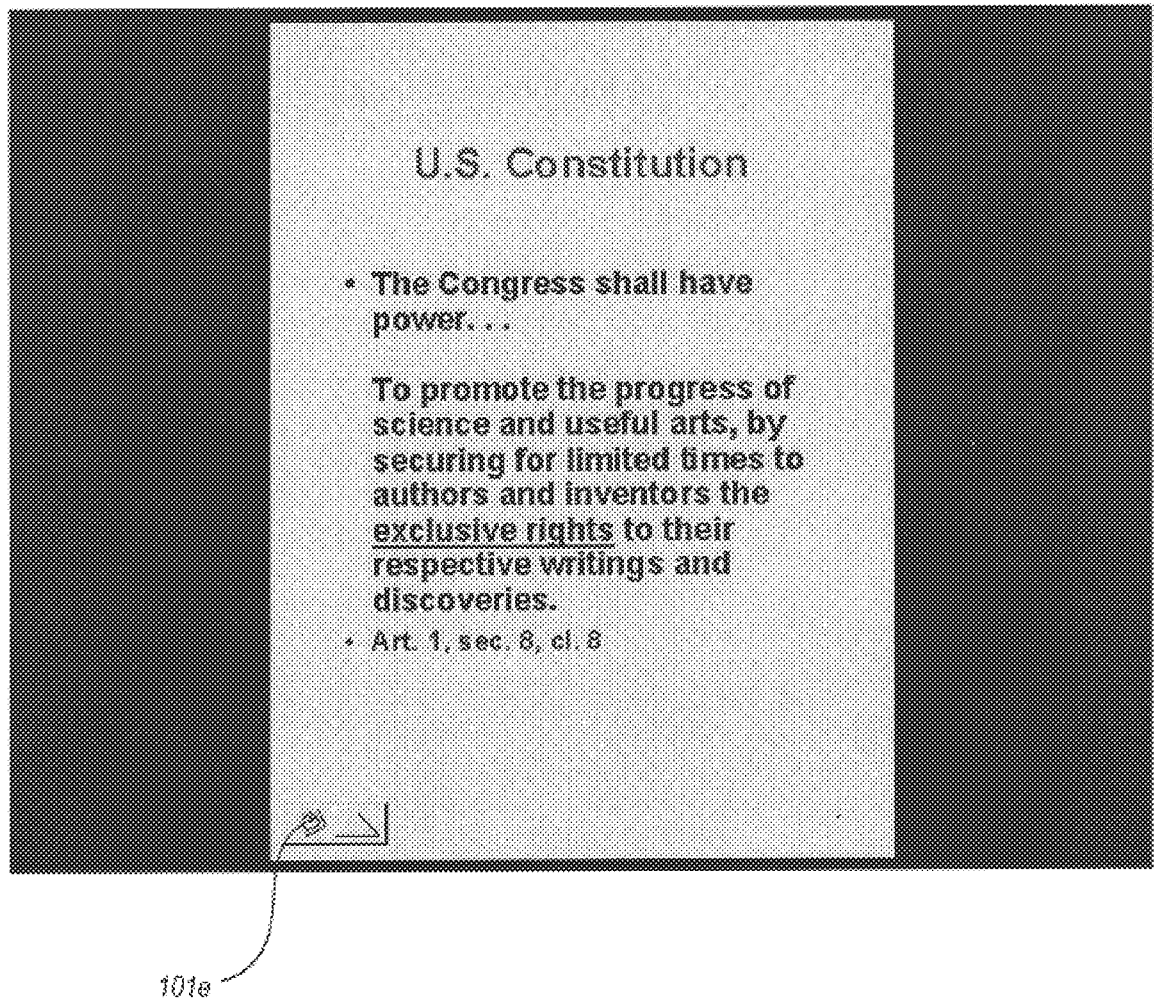

FIG. 1E shows the conference window of an audience member. The conference window contains only the information corresponding to the presenter's presentation window. The audience member can select the button 1E01 to display a pop-up menu with options to exit the presentation and to set the color for drawing mode. Both the presenter and the audience members are permitted to draw on the presentation using an input device such as a mouse. The data drawn is displayed concurrently on the presentations of all other conferences. The colors can be used to differentiate each conferee's drawings.

Figure 1F:
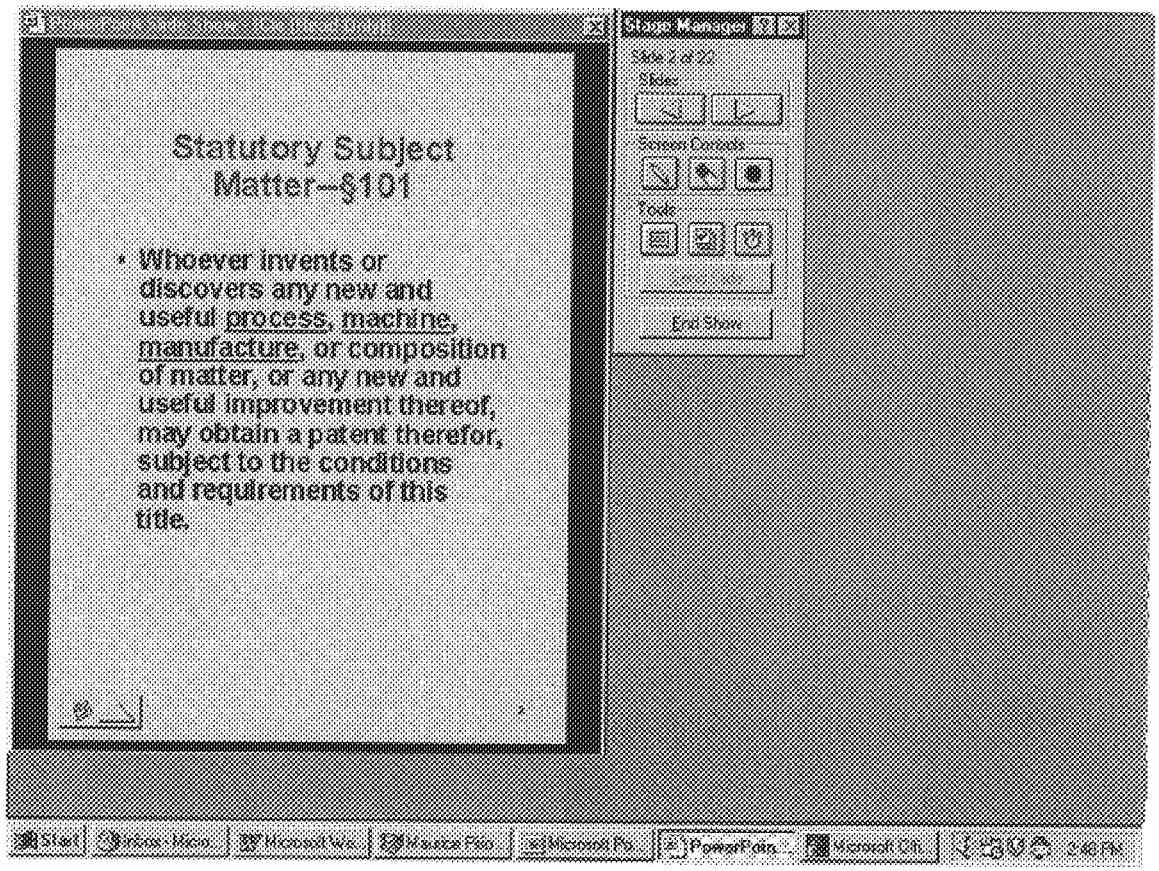
Figure 1G:
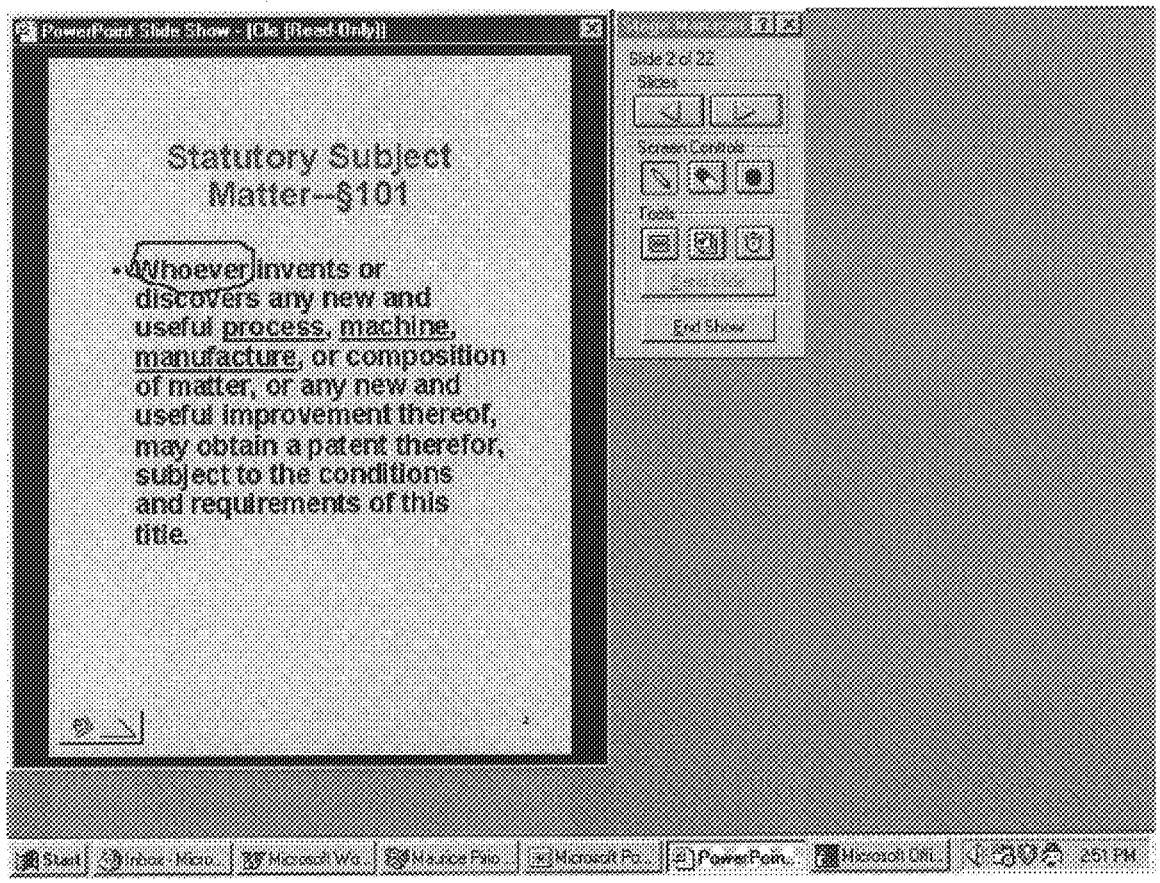
Figure 1H:
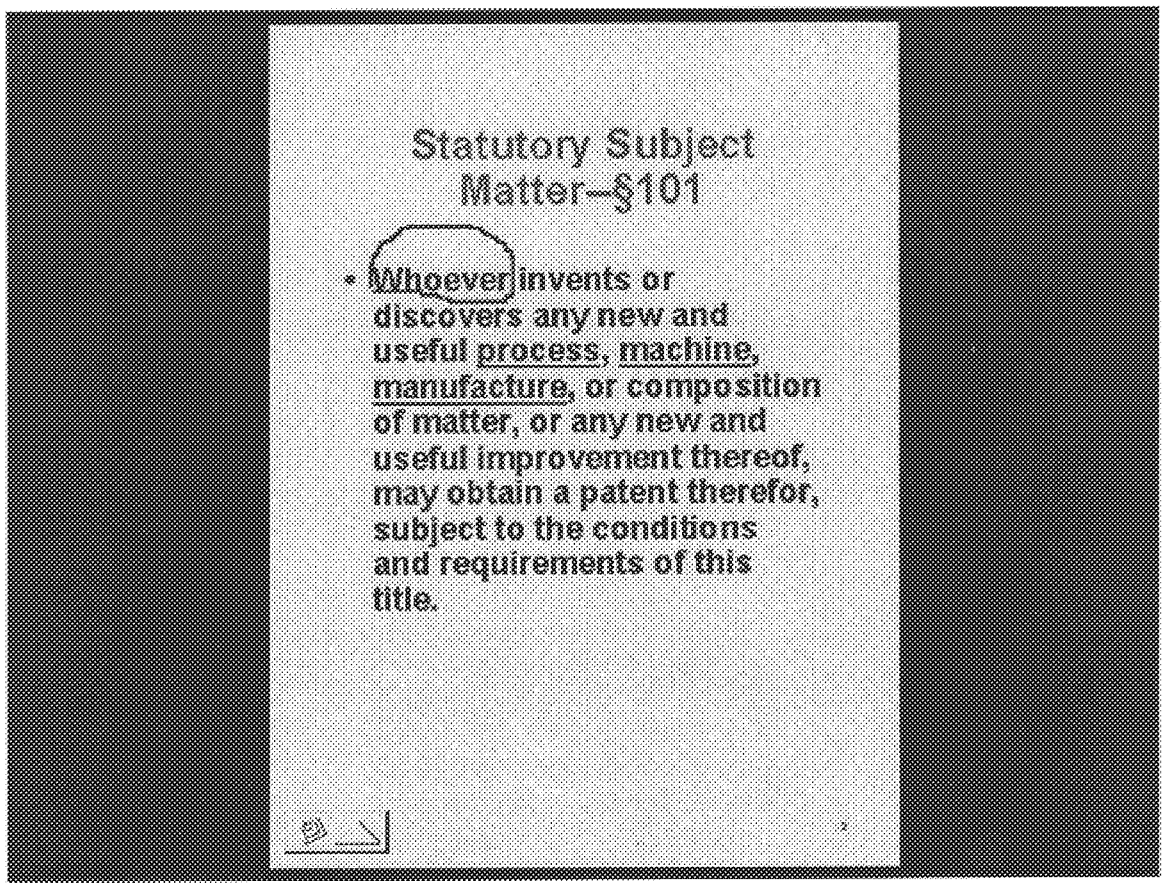
Figure 1J:
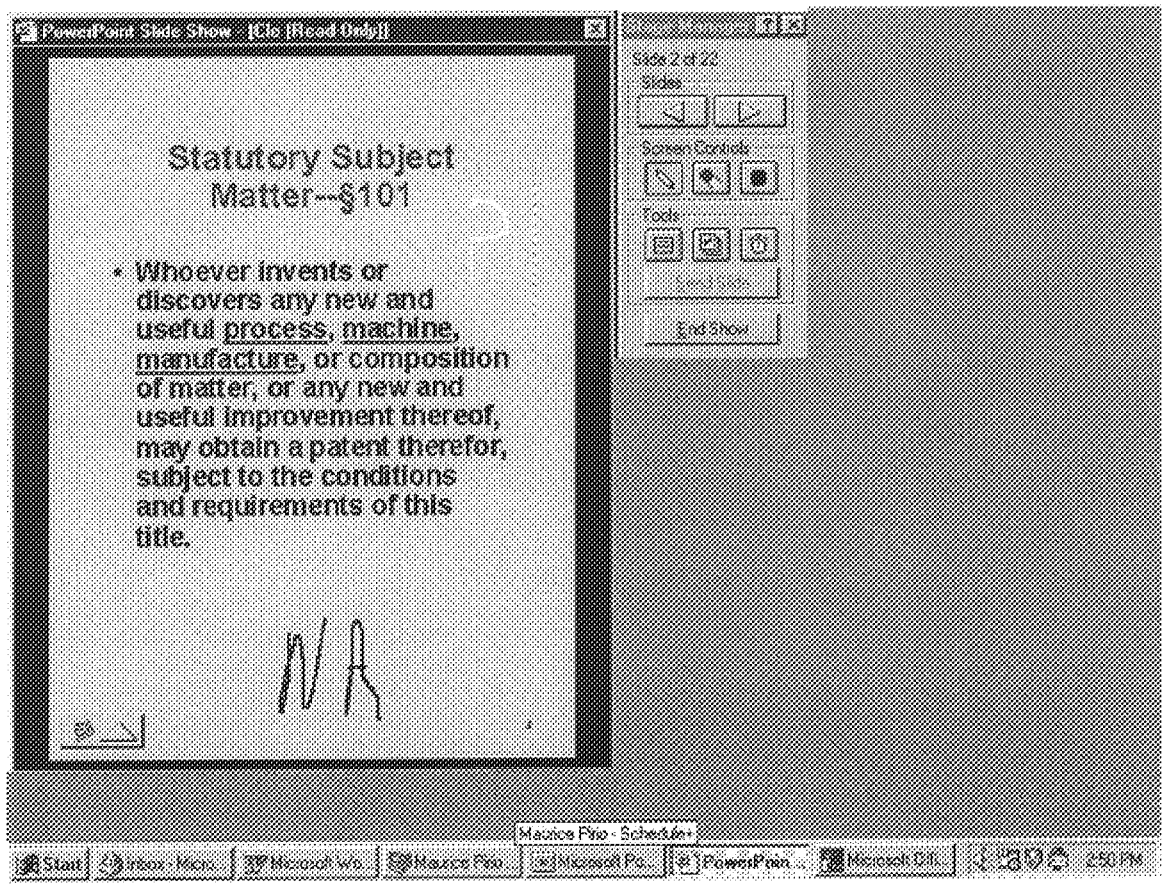

FIG. 1F shows the presenter's conference window after the next side has been selected. The conference window of each audience member would be changed to display the same slide. FIG. 1G shows the presenter has drawn data into the presentation with a mouse. FIG. 1H shows the conference window of an audience member with the presenter's drawing. FIG. 1I shows an audience member's conference window with a drawing by the audience member. FIG. 1J shows the presenter's conference window with the audience members drawing along with the presenter's response.

The presentation application exposes its functionality to the conference subsystem through various interfaces. The conference subsystem invokes the methods of these interfaces to direct the presentation application to perform a behavior. In a preferred embodiment, the interfaces are exposed using the architecture known as Object Linking and Embedding (OLE) Automation provided by Microsoft Corporation. OLE Automation is described in the book by Kraig Brockschmidt, *Inside OLE*, 2d ed., Microsoft Press, 1995. When the conference subsystem receives a command, it invokes the appropriate methods of the exposed interfaces.

The conference subsystem allows any user to draw data on the conference window, which is then sent to the other conferees for display. If the conferee is the presenter, the presenter sends the drawn data to each audience member. The conference subsystem of each audience member receives the data and then directs the presentation application to display the data. If the conferee is an audience member, the audience member sends the drawn data to the presenter. When the conference subsystem of the presenter receives the data, it directs the presentation application to draw the data and sends the drawn data to the other audience members.

In a preferred embodiment, the presenter controls the presentation. The audience member can only leave the presentation or drawn data on the conference window.

Figure 2A:
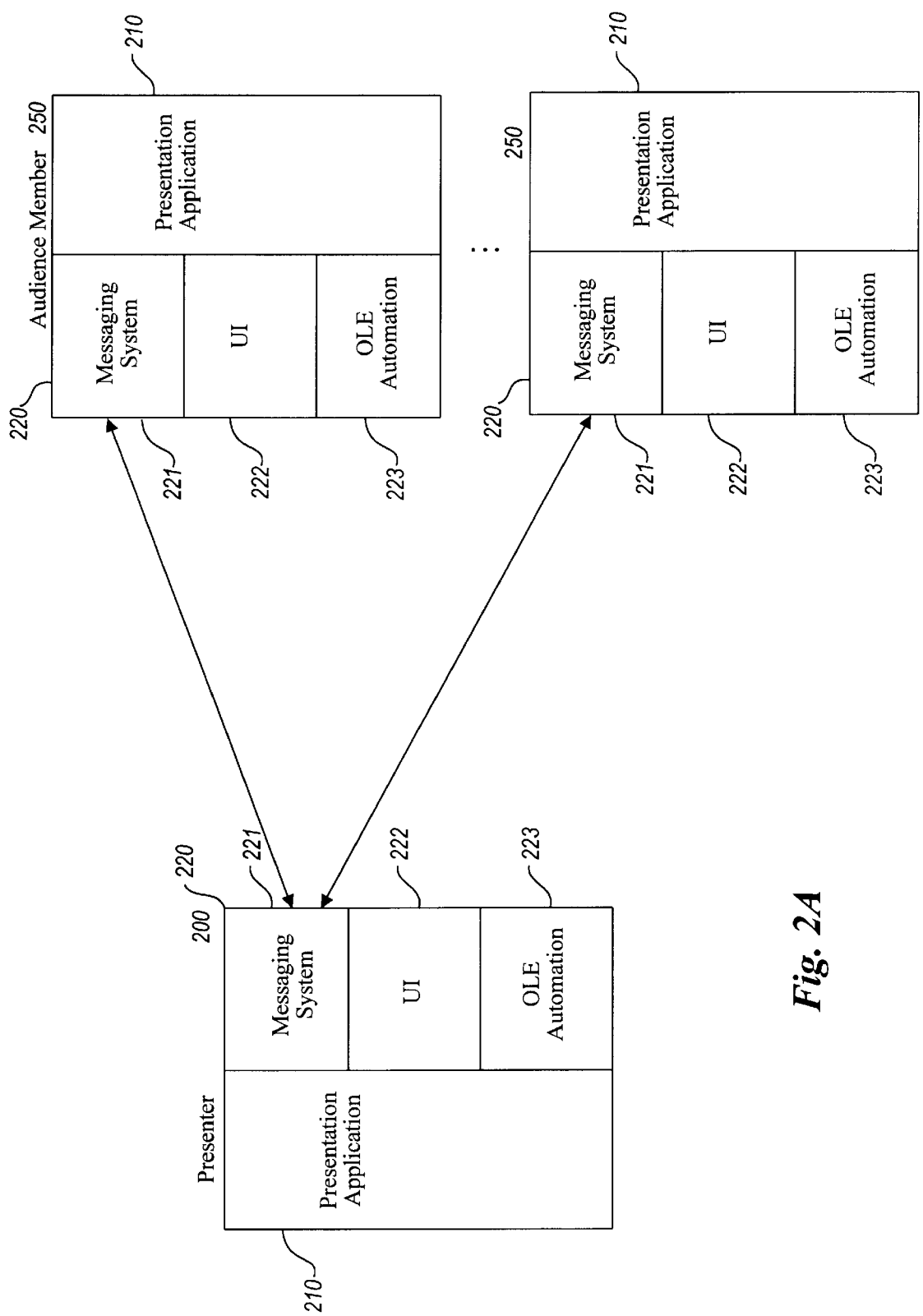
FIG. 2A is a block diagram illustrating components of the present invention.

FIG. 2A is a block diagram illustrating components of the present invention. Each conferee computer system contains the presentation application 2A10 and the conferencing system 2A20. The conference subsystem contains a messaging component 2A21, a user interface component 2A22, and an OLE automation component 2A23. The presenter 2A00 is connected through a communications channel to each audience member 2A50. The communications channel can be any form of computer system interconnection including a local area network, the Internet, or a modem. The messaging component controls the receiving and sending of the messages on the communications channel. The user interface component receives input from the conferee and displays the presentation. The OLE automation component controls the exposed interfaces of the presentation application.

Figure 2B:
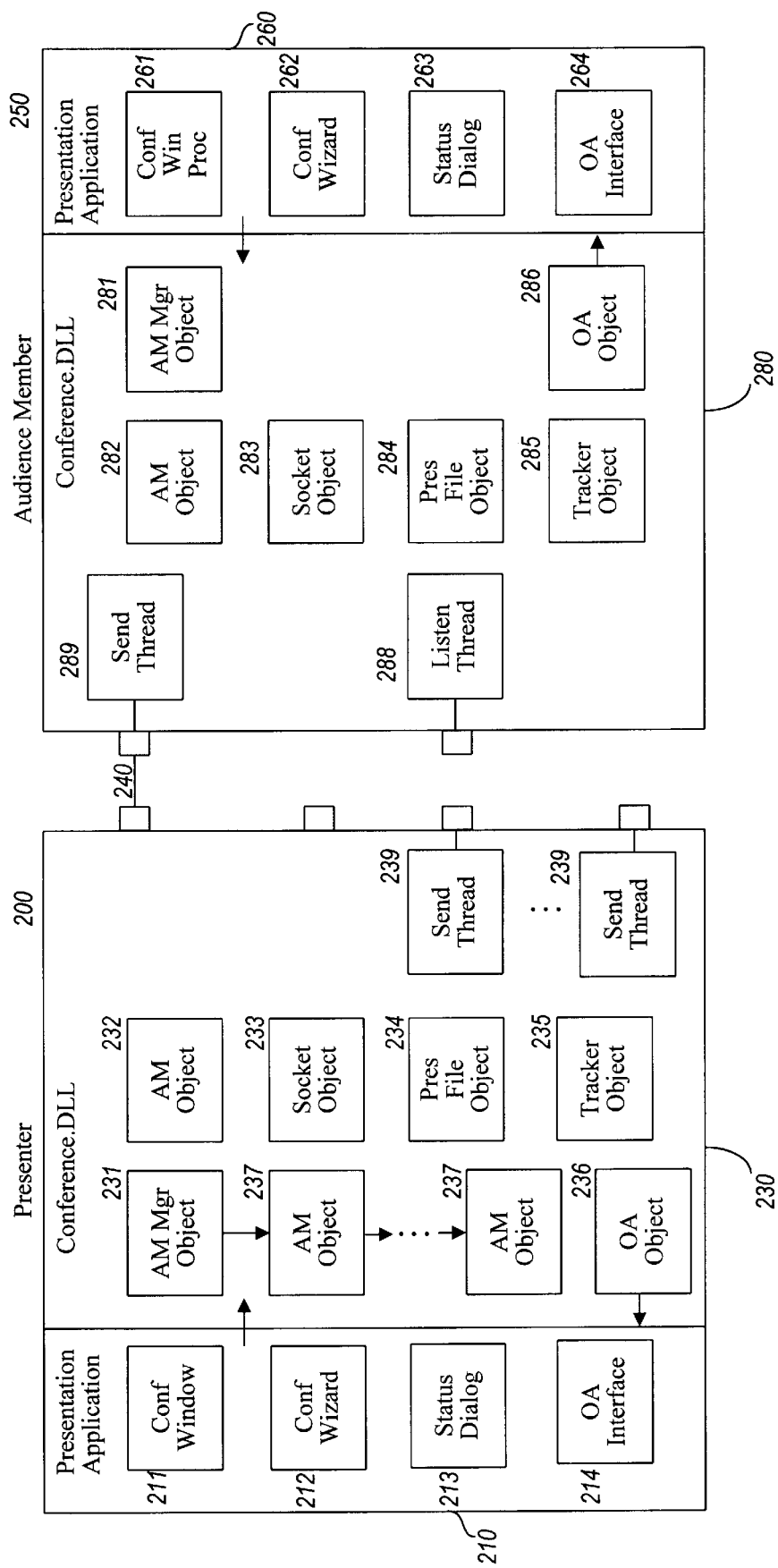
FIG. 2B is a detailed block diagram illustrating the components of the conferencing system.

FIG. 2B is a detailed block diagram illustrating the components of the conferencing system. The conferencing system comprises the same software components for a presenter 2B00 and an audience member 2B50. The presenter 2B00 comprises the presentation application 2B10 and a conference subsystem 2B30. Similarly, the audience members 2B50 contain the presentation application 2B60 and a conference subsystem 2B80. Although the software at both the presenter and the audience member are the same, the data structures and threads created by the conference subsystem depend on whether the conferee is a presenter or an audience member.

The presentation application 2B10 contains a conference window procedure 2B11, a conference wizard 2B12, a status dialog 2B13, and an exposed OLE automation interface 2B14. The window procedure for the conference window is invoked when a user decides to participate in a conference and invokes the procedures provided by the conference subsystem. All OLE automation commands are preferably performed in the main thread of the presentation application to obviate contention problems. Thus, the conference subsystem posts an indication of each command received from another conferee to the conference window procedure, which in turn invokes the procedures of the conference subsystem. The conference wizard is invoked by a menu item selection in the presentation application. The conference wizard inputs from the conferee whether the conferee is to be the presenter or an audience member, and then invokes the procedures of the conference subsystem to start the conference. The conference wizard also creates the status dialog 2B13, which displays status information about the connection process of the conference. The OLE automation interface exposes the functionality of the presentation application to the conference subsystem.

The conference subsystem 2B30 for the presenter contains an audience member manager ("AMMgr") object 2B31 and a global audience member ("AM") object 2B32, although it only uses the AMMgr object. The conference subsystem 2B30 also contains a socket object 2B33, presentation file object 2B34, tracker object 2B35, and OLE Automation ("OA") object 2B36. In addition, the conference subsystem of the presenter 2B30 contains an AM object for each audience member. The AMMgr object controls access to the socket object, presentation file object, and OA object. The AMMgr object also controls the creation and access to the AM objects, which represent the audience members. The socket object provides methods for accessing and controlling the sockets, which are a preferred interface to the communications channel. The presentation file object provides methods for interfacing with the presentation file. The OA object provides methods that interface with the OLE automation component for performing commands. The OA object is presentation-application specific. That is, a new OA object typically needs to be implemented to adapt to the different interfaces that are exposed by the various types of applications (e.g., slide show programs and word processing programs). If, however, various presentation applications expose a standard set of interfaces, then the same OA object implementation can be used for such presentation applications. The OA object invokes the methods of the interfaces exposed by the OLE automation interface of the presentation application. The tracker object provides for tracking mouse movements for drawing on the conference window and displaying drawn data. When the presenter sends a command string to the audience members, a send thread 2B39 is created for each audience member to control the sending of the string. The presenter is connected to each audience member through a socket 2B40. The socket is for receiving data from the audience member and for sending commands to the audience members. Thus, the presenter has one socket for each audience member. The presenter receives messages asynchronously from the audience members. When a message is received from an audience member, a message is posted by the socket to the presentation application. When the presentation receives the posted message, it invokes a procedure of the conference subsystem to read and process the message from the audience member.

The audience member component 2B50 also contains a presentation application 2B60, and conference subsystem 2B80. The conference subsystem creates an AMMgr object 2B81 and an AM object 2B82, although it only uses the AM object. In addition, the conference subsystem creates a socket object 2B83, a presentation file object 2B84, a tracker object 2B85, and an OA object 2B86. The conference subsystem creates a listen thread 2B88 to listen on the socket connected to the presenter and creates a send thread 2B89 each time data is to be sent to the presenter. The listen thread blocks waiting for data to be received from the presenter. Since only the thread is blocked, the presentation application can continue to execute. The listen thread posts a message corresponding to each received command to the conference window. The conference window procedure then invokes a procedure of the conference subsystem to direct the presentation application to perform the behavior of the command. The sockets are typically controlled by the several functions. The functions WSAStartup and socket initialize the socket. The function bind binds to a socket. The function listen sets a socket to listen for communications. The function accept accepts a socket. The function recv receives data. The function closesocket and WSACleanup close the socket.

Conference Window Procedure

Figure 3:
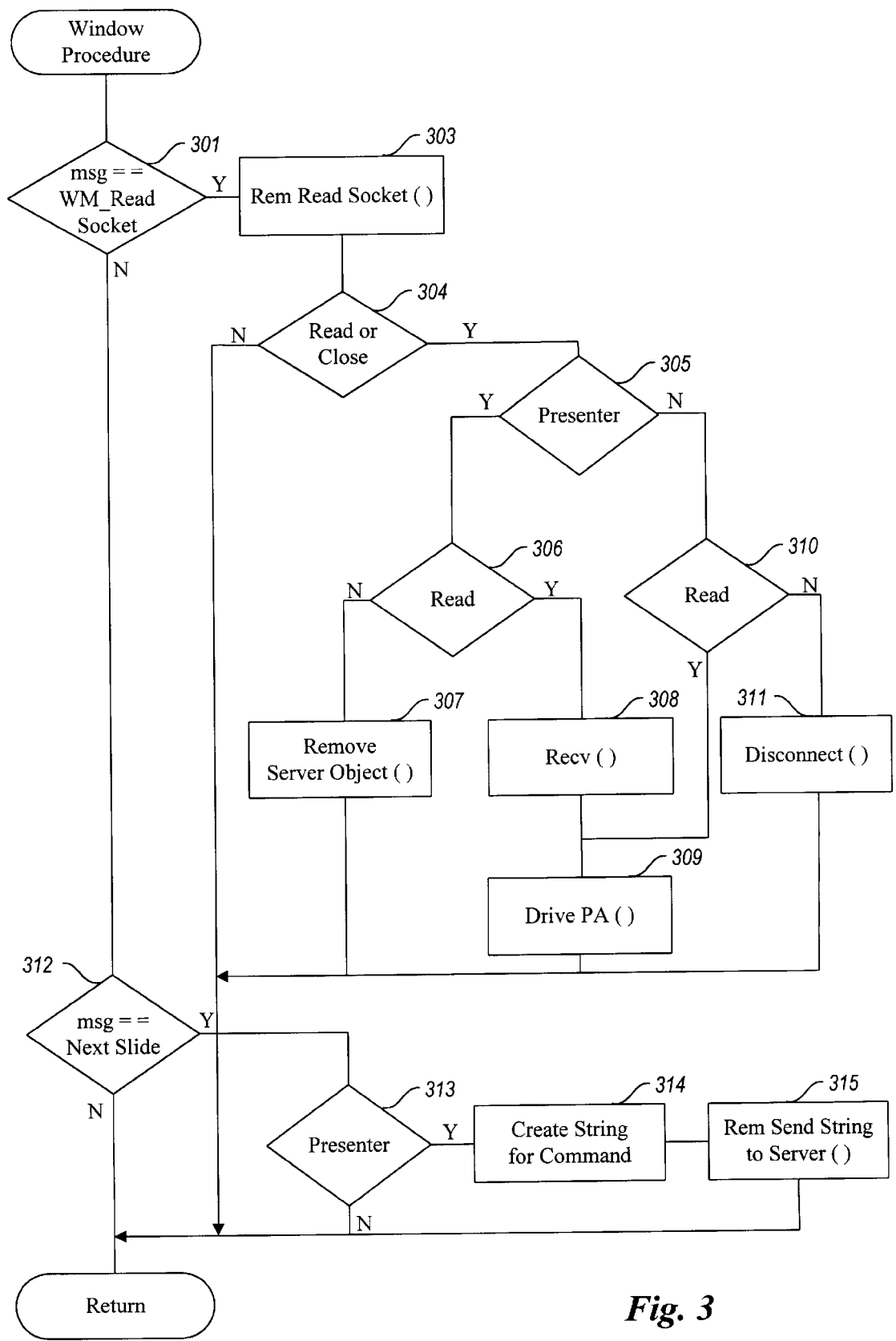
FIG. 3 is a flow diagram of the conference window procedure.

FIG. 3 is a flow diagram of the conference window procedure, which is invoked by the main window procedure of the application. The conference window procedure controls the conference. The procedure receives all input events from the user. If the conferee is an audience member, then the only input that is processed relates to drawing on the conference window and an indication to terminate participation in the conference. The conference window procedure for an audience member also receives messages from the listen thread indicating that data has been received. The conference window procedure for a presenter receives input from the user and directs the conference subsystem to perform a behavior based on that input. In step 301, if the message indicates that either the listen thread for the audience member or the socket for the presenter has received data, then the procedure continues at step 303, else the procedure continues at step 312. In step 303, the procedure invokes the procedure RemReadSocket of the conference subsystem, which directs the conference subsystem to read the data from the socket. In step 304, if the status from the read socket indicates a read or a close, then the procedure continues at step 305, else the procedure returns. In step 305, if the conferee is the presenter, then the procedure continues at step 306, else the procedure continues at step 310. In step 306, if the status indicates a read, then the procedure continues at step 308, else the procedure continues at step 307. In step 307, the procedure invokes a function to terminate the conference. In step 308, the procedure invokes the function Recv to receive the socket data. In step 309, the procedure invokes the method DrivePA of the OA object to direct the presentation application to perform the behavior. In step 310, if the status is read, then the procedure continues at step 309, else the procedure continues at step 311. In step 311, the procedure invokes the function RemDisconnectFromP to disconnect the audience member and returns. In step 312, if the message indicates a presentation control command, such as go to next slide, then the procedure continues at step 313. In step 313, if the window procedure is the presenter's, then the procedure continues at step 314, else the procedure returns. In step 314, the procedure creates a command string for going to the next slide. In step 315, the procedure invokes the procedure RemStringToAM to send the command to audience members, and then returns. Although not shown in FIG. 3, the conference window procedure processes many other messages including mouse movement messages.

Conference Wizard

Figure 4:
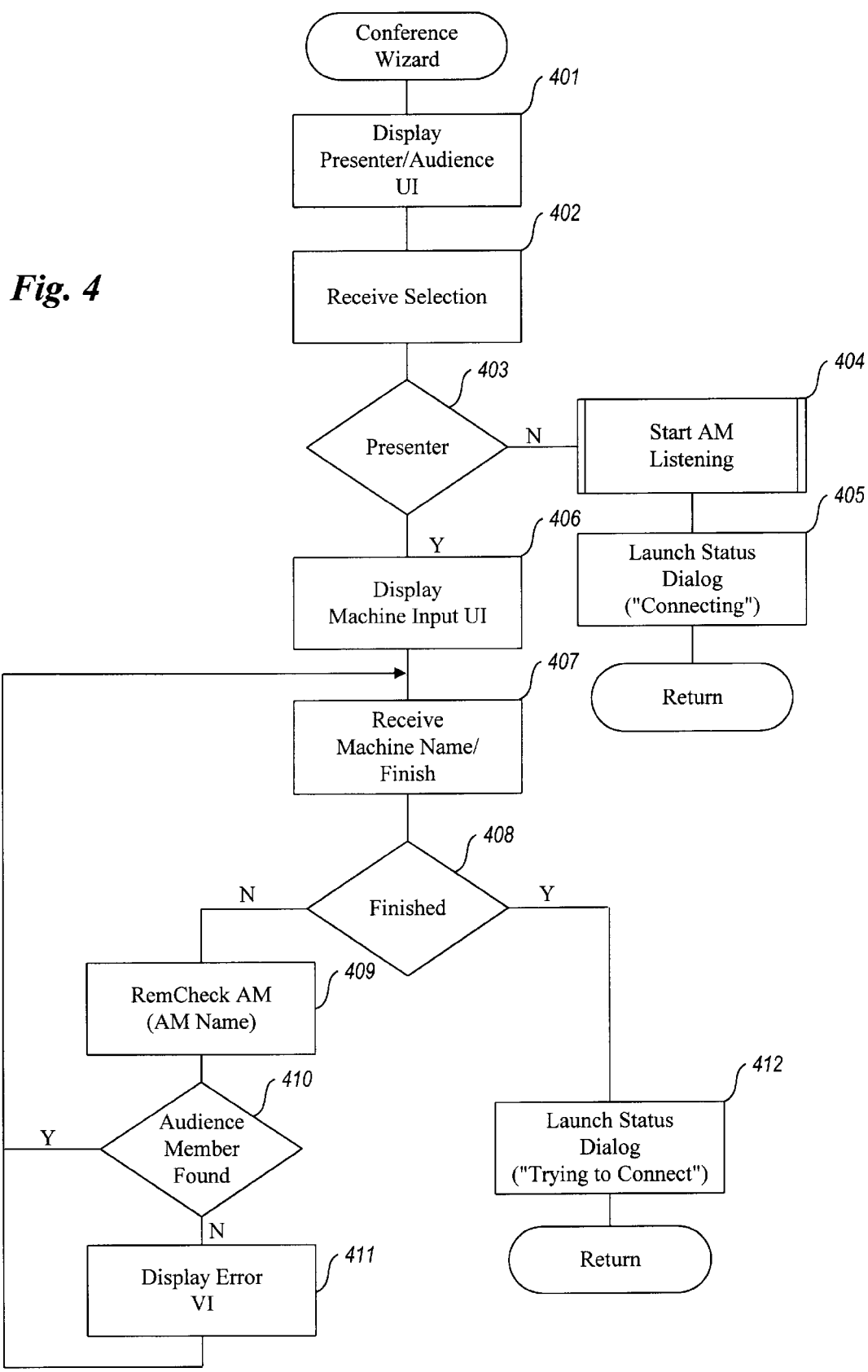
FIG. 4 is a flow diagram of the Conference Wizard.

FIG. 4 is a flow diagram of the Conference Wizard. The Conference Wizard displays the initial user interface to receive the indication of whether the conferee is the presenter or an audience member and initializes the conference system accordingly. In step 401, the wizard displays the Presenter/Audience Member user interface. In step 402, the wizard receives the conferee selection. In step 403, if the conferee is the presenter, then the wizard continues at step 406, else the wizard continues at step 404. In step 404, the wizard invokes the procedure StartAMListening (described below) to start the conferee listening for messages from the presenter. In step 405, the wizard launches a status dialog indicating that the audience member is in the process of connecting, and then returns. In step 406, the wizard displays the user interface for the input of audience member computer names by the user. In steps 407–411, the wizard loops receiving the identification of the audience members and checking whether that is a valid identification. In step 407, the wizard receives an identification of an audience member or a finish indication. In step 408, if finish is received, then the wizard continues at step 412, else the wizard continues at step 409. In step 409, the wizard invokes the procedure RemCheckAM to ensure that the audience member has not already been entered. In step 410, if the audience member has been entered before, then the wizard displays an error message in step 411. The wizard then loops to step 407 to receive the name of the next audience member. In step 412, the wizard launches the status dialog and returns.

Figure 5:
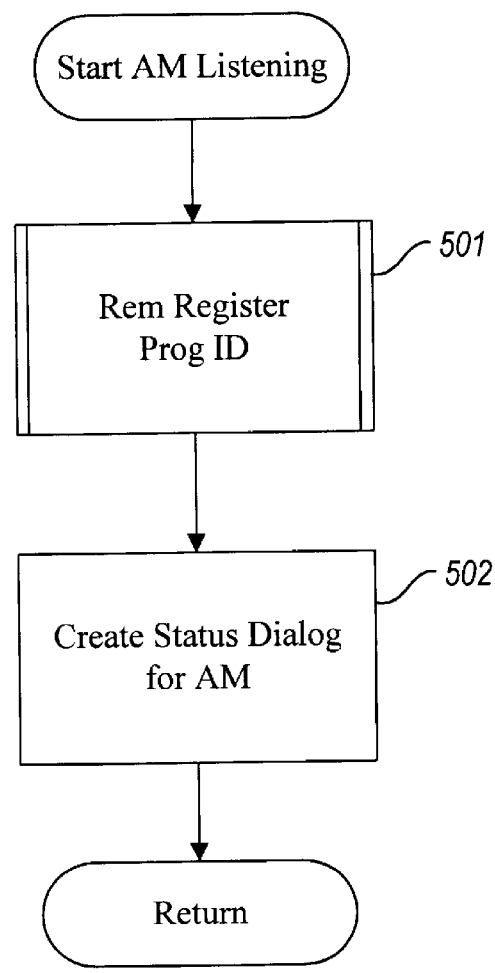
FIG. 5 is a flow diagram of the procedure StartAMListening.

FIG. 5 is a flow diagram of the procedure StartAMListening. This procedure is invoked by the conference wizard of an audience member to start the audience member listening for commands from the presenter. In step 501, the procedure invokes the procedure RemRegisterProgID passing the identification of the presentation application. In step 502, the procedure creates a status dialog for the audience member and returns.

Status Dialog

Figure 6:
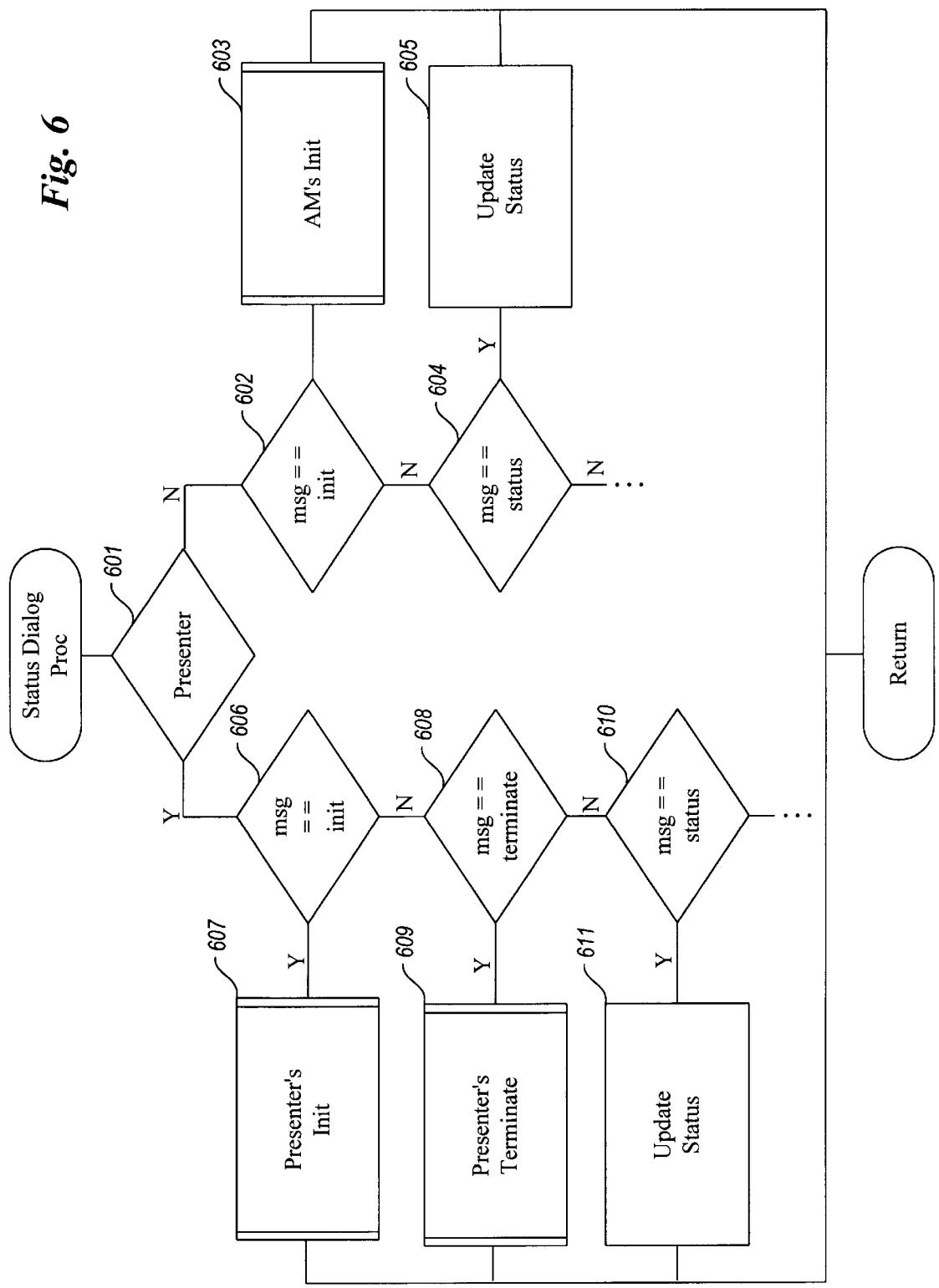
FIG. 6 is a flow diagram of the status dialog procedure.

FIG. 6 is a flow diagram of the status dialog procedure. The status dialog procedure directs the performing of certain initialization and termination functions of the conferee. In steps 602–605, the procedure processes messages when the conferee is an audience member. In steps 606–611, the procedure processes messages when the conferee is the presenter. One skilled in the art would appreciate that alternatively the presenter and the audience members could have their own status dialogs. In step 602, if the message indicates to initialize the status dialog, then the procedure invokes the procedure AMInit (described below) to control the initialization of the audience member and returns. In step 604, if the message indicates to update the status dialog, then the procedure updates the status in step 605 and returns. In step 606, if the message is an initialize message for the presenter, then the procedure invokes the procedure PresenterInit (described below) in step 607 and returns. In step 608, if the message is a terminate message, then the procedure invokes the procedure PresenterTerminate (described below) in step 609 and returns. In step 610, if the message indicates to update the status dialog, then the procedure updates the status in step 611 and returns. The procedure also processes standard dialog messages as represented by the ellipsis.

Figure 7:
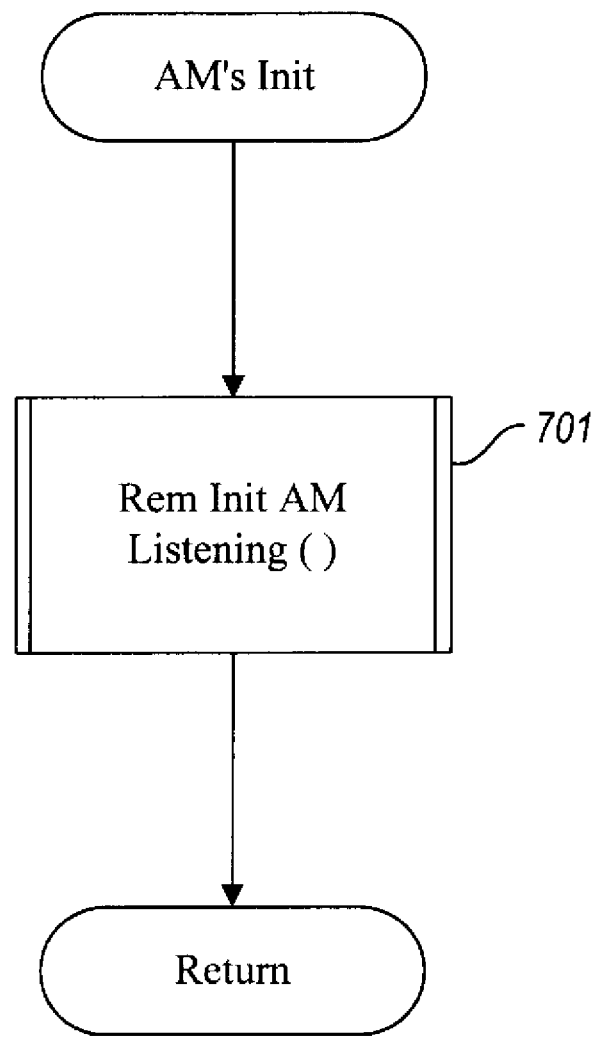
FIG. 7 is a flow diagram of the procedure AMInit.

FIG. 7 is a flow diagram of the procedure AMInit. The procedure AMInit initializes an audience member. In step 701, the procedure invokes procedure RemInitAMListening to initialize the audience member to listen from the presenter and returns.

Figure 8:
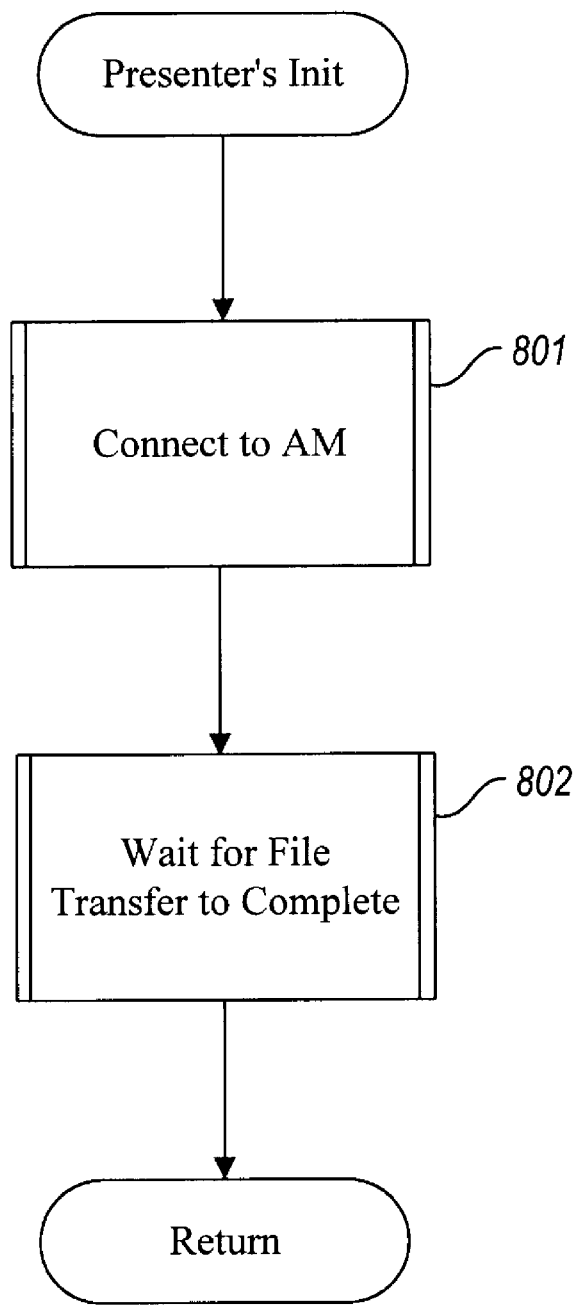
FIG. 8 is a flow diagram of the procedure PresenterInit.

FIG. 8 is a flow diagram of the procedure PresenterInit. The procedure initializes the conference subsystem. During initialization, a connection is established to each audience member and the presentation file is transferred to each audience member. In step 801, the procedure invokes the procedure ConnectToAM (described below) to connect to each of the audience members. In step 802, the procedure invokes the procedure WaitForFileTransferToComplete (described below), to transfer the file to each audience member, and returns.

Figure 9:
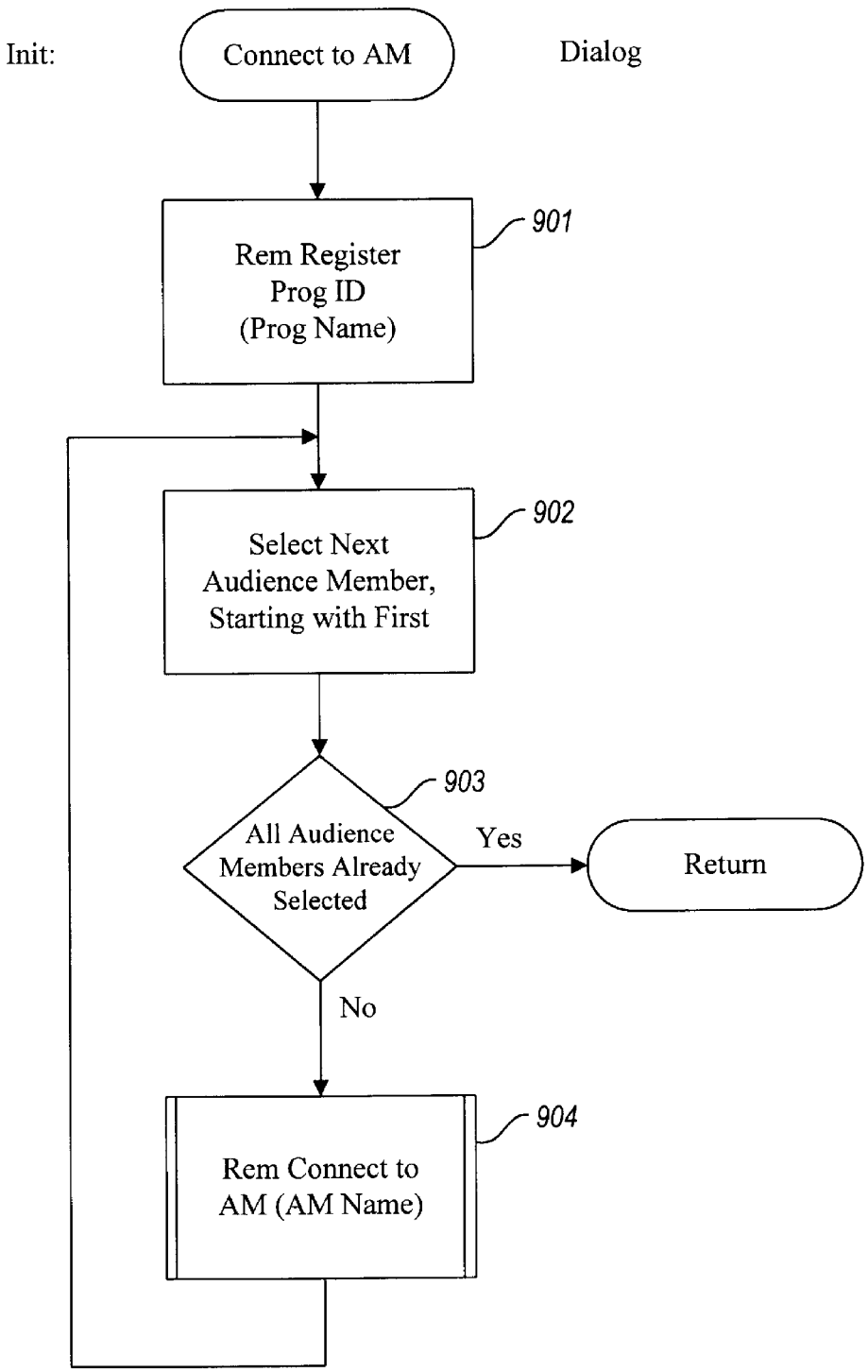
FIG. 9 is a flow diagram of the procedure ConnectToAM.

FIG. 9 is a flow diagram of the procedure ConnectToAM. The procedure ConnectToAM establishes a connection with each of the audience members identified by the presenter. In step 901, the procedure invokes procedure RemRegisterProgID passing the program name of the presentation application. In steps 902–904, the procedure loops registering each audience member. In step 902, the procedure selects the next audience member starting with the first. In step 903, if all the audience members have already been selected, then the procedure returns, else the procedure continues at step 904. In step 904, the procedure invokes the procedure RemConnectToAM passing the name of the selected audience member and then loops to step 902 to select the next audience member.

Figure 10:
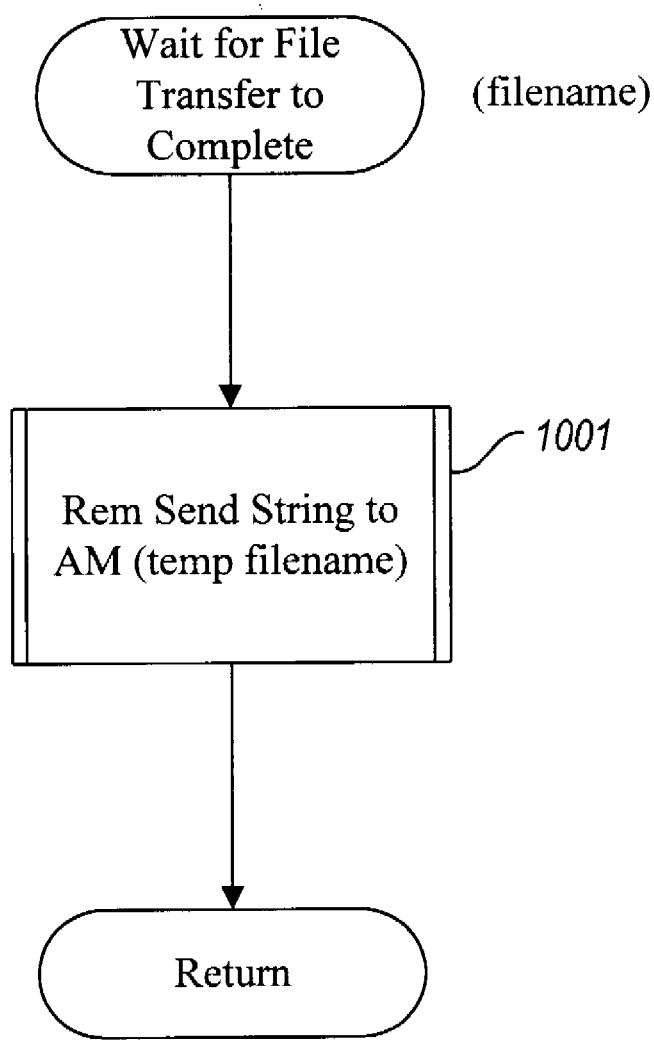
FIG. 10 is a flow diagram of the procedure WaitForFileTransferToComplete.
Figure 11:
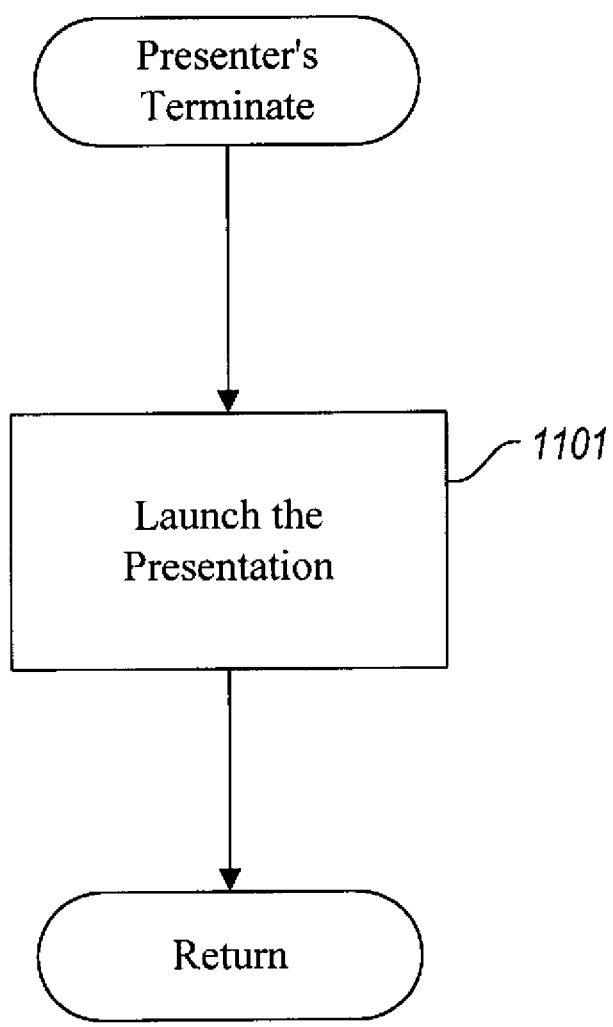

FIG. 10 is a flow diagram of the procedure WaitForFileTransferToComplete. The procedure WaitForFileTransferToComplete is passed the name of the presentation file. The procedure sends a copy of the presentation file to each audience member. In step 1002, the procedure invokes the procedure RemSendStringToAM passing the name of the presentation file and then returns.

Figure 11:
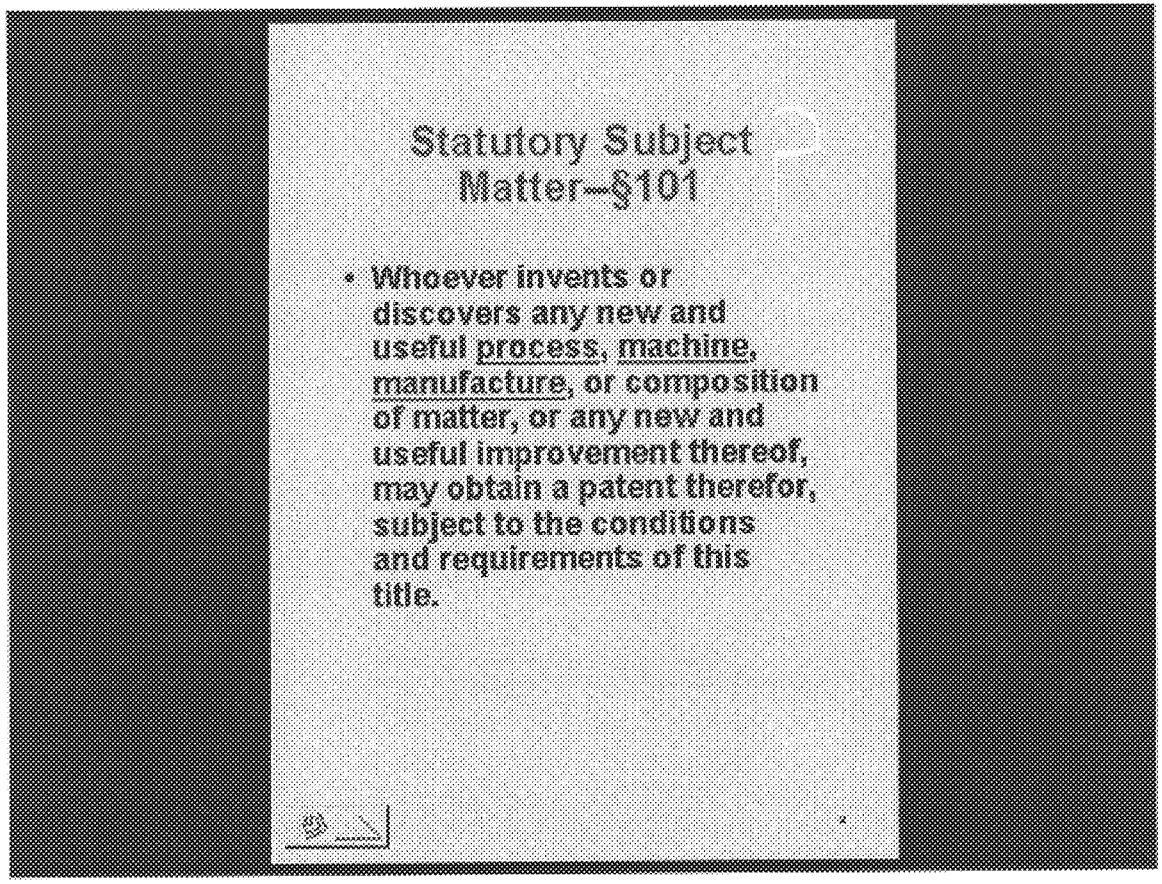
FIG. 11 is a flow diagram of the procedure PresenterTerminate.

FIG. 11 is a flow diagram of the procedure PresenterTerminate. The procedure processes a terminate message that is sent to the status dialog. In step 1101, the procedure invokes a procedure that launches the presentation into a conferencing mode and returns.

Conference Subsystem

FIGS. 12–23 are flow diagrams of the application programming interfaces (API) of the conferencing subsystem.

RemRegisterProgID

Figure 12:
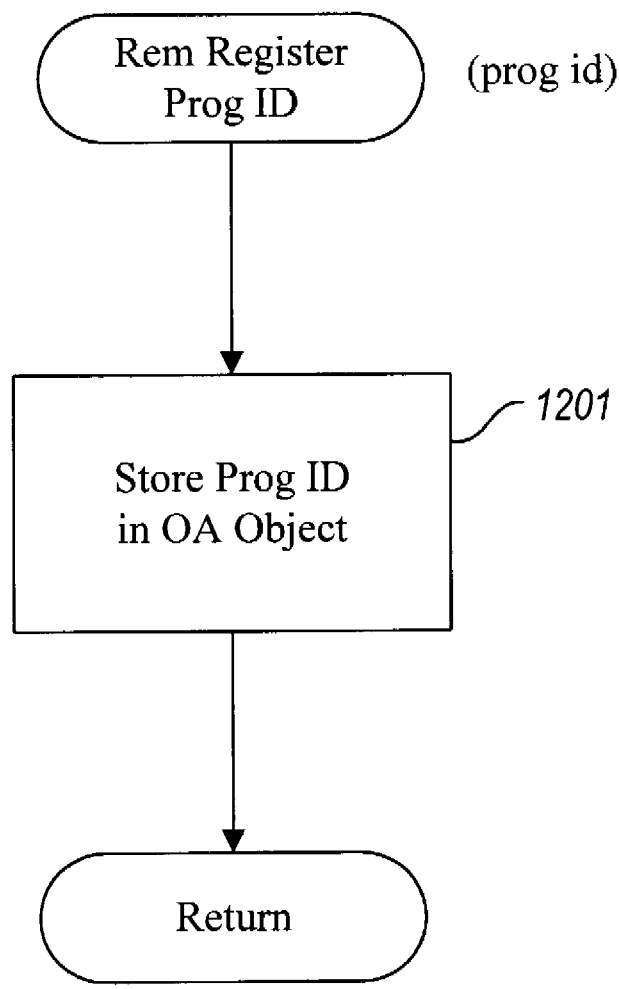
FIG. 12 is a flow diagram of the RemRegisterProgID.

FIG. 12 is a flow diagram of the procedure RemRegisterProgID. The procedure RemRegisterProgID is passed an OLE Programmatic Identifier ("ProgID") of the presentation application and stores it in the OA object in step 1201 and returns. The program name is used to retrieve the handle of the conference window.

RemGetMachineName

Figure 13:
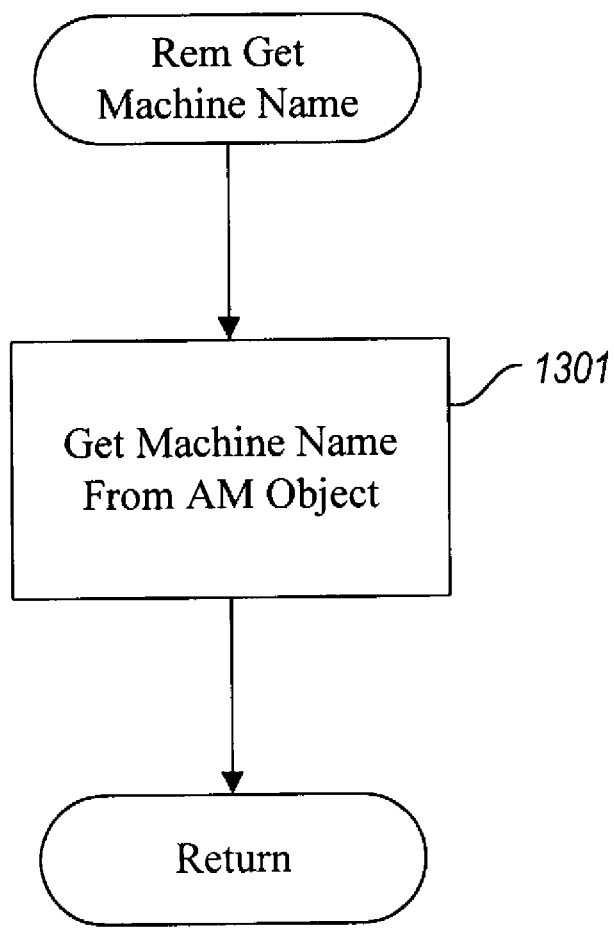
FIG. 13 is a flow diagram of the RemGetMachineName.

FIG. 13 is a flow diagram of the procedure RemGetMachineName. The procedure RemGetMachineName retrieves the machine name from the global AM object in step 1301 and returns. The machine name is sent by an audience member to the presenter to acknowledge completion of a command.

RemConnectToAM

Figure 14:
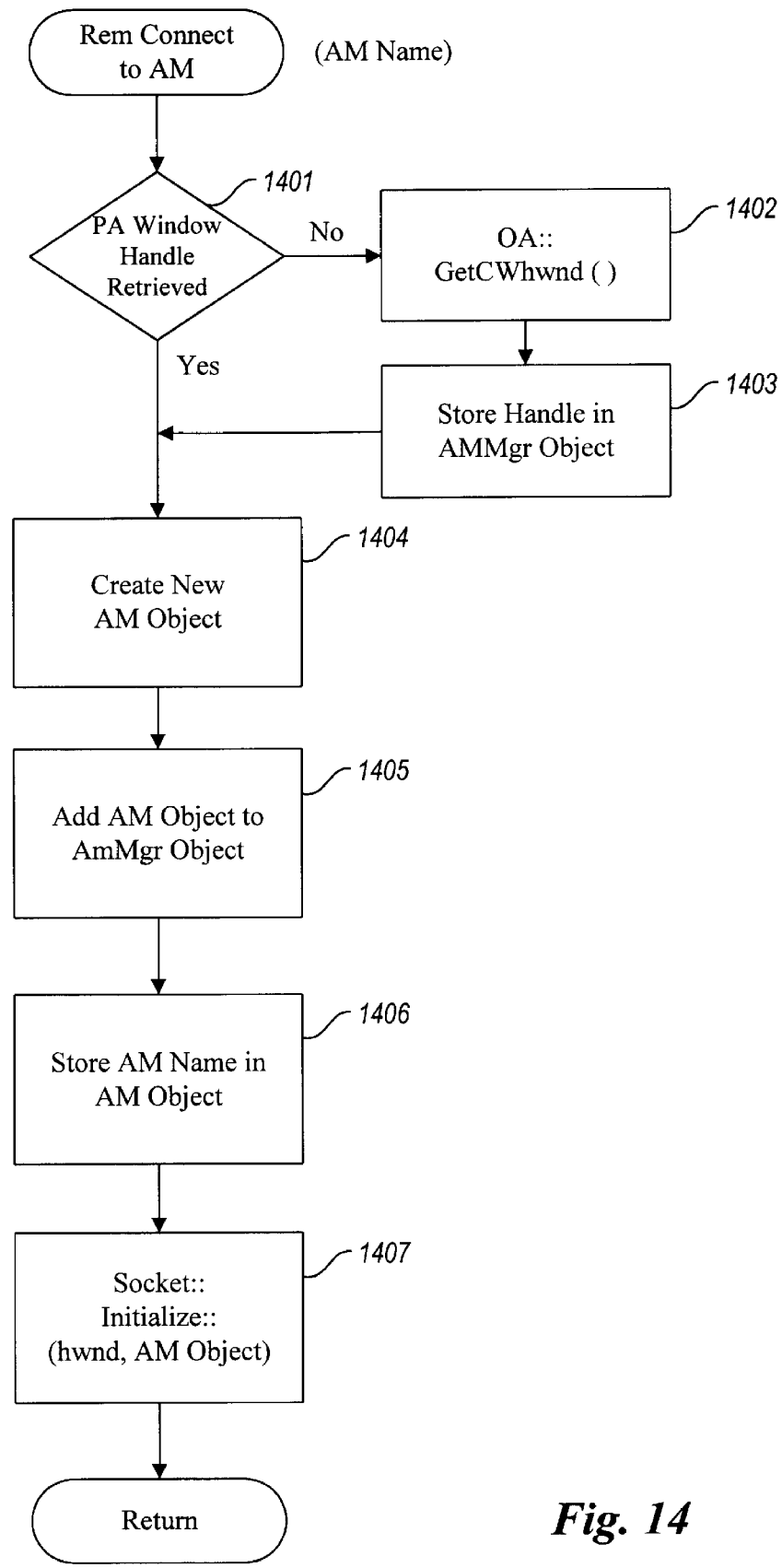
FIG. 14 is a flow diagram of the procedure RemConnectToAM.

FIG. 14 is a flow diagram of the procedure RemConnectToAM. The procedure RemConnectToAM is passed the name of an audience member. The procedure is invoked by a presenter to connect to the passed audience member. In step 1401, if the handle of the conference window has already been retrieved in a previous invocation, then the procedure continues at step 1404, else the procedure continues at step 1402. In step 1402, the procedure invokes the method GetCWHWND of the OA object to retrieve the handle of the conference window. In step 1403, the procedure stores the retrieved window handle into the AMMgr object. In step 1404, the procedure creates a new AM object to contain information for the passed audience member. In step 1405, the procedure adds the created AM object to the AMMgr object. In step 1406, the procedure stores the passed AM name in the created AM object. In step 1407, the procedure invokes the method Initialize of the socket object passing the window handle, a reference to the created AM object, and an indication that the socket is for receiving and then returns.

RemCheckAM

Figure 15:
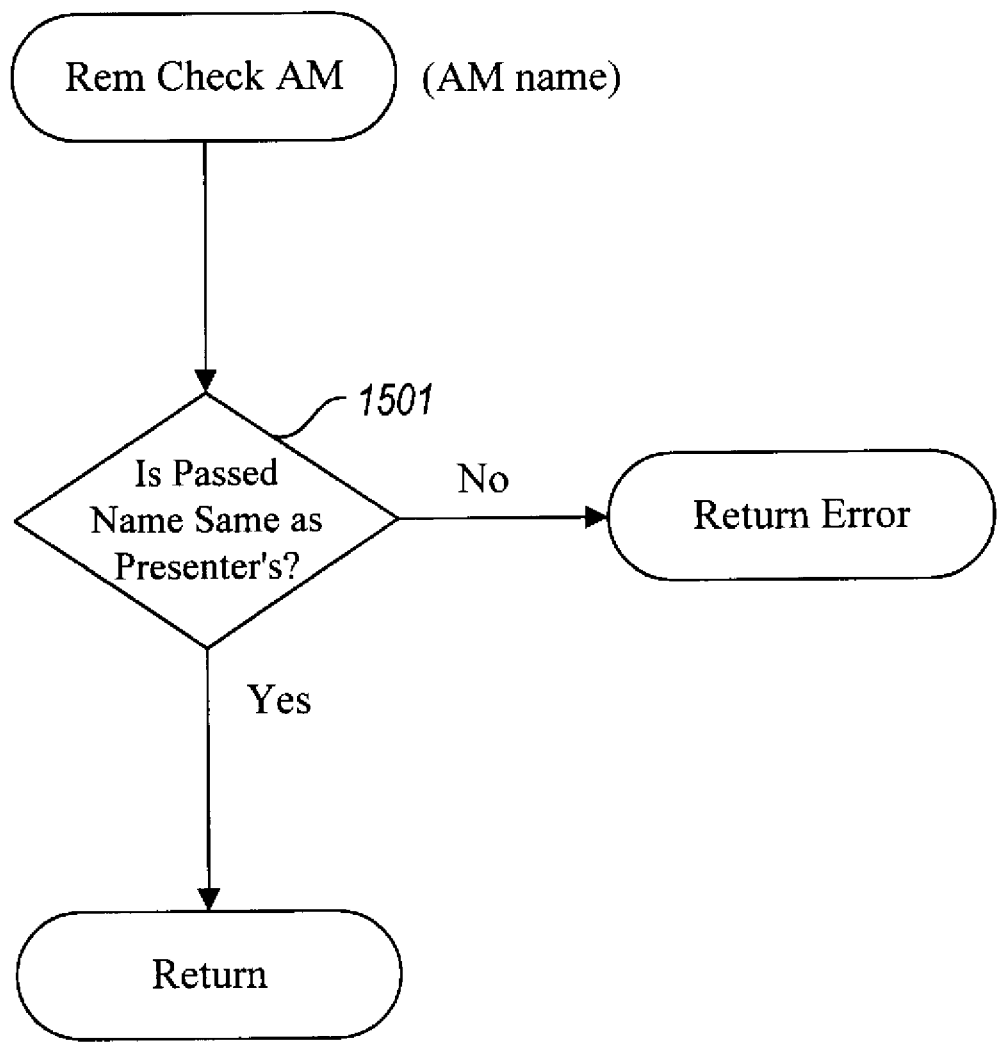
FIG. 15 is a flow diagram of the procedure RemCheckAM.

FIG. 15 is a flow diagram of the procedure RemCheckAM. The procedure RemCheckAM is passed the name of an audience member and knows that the passed name is not the same as the presenter's name. In step 1501, if the passed name is the same as the presenter's name, the procedure then returns with an indication that the check passed, else the procedure returns with an indication that the check failed.

RemSendStringToAM

Figure 16:
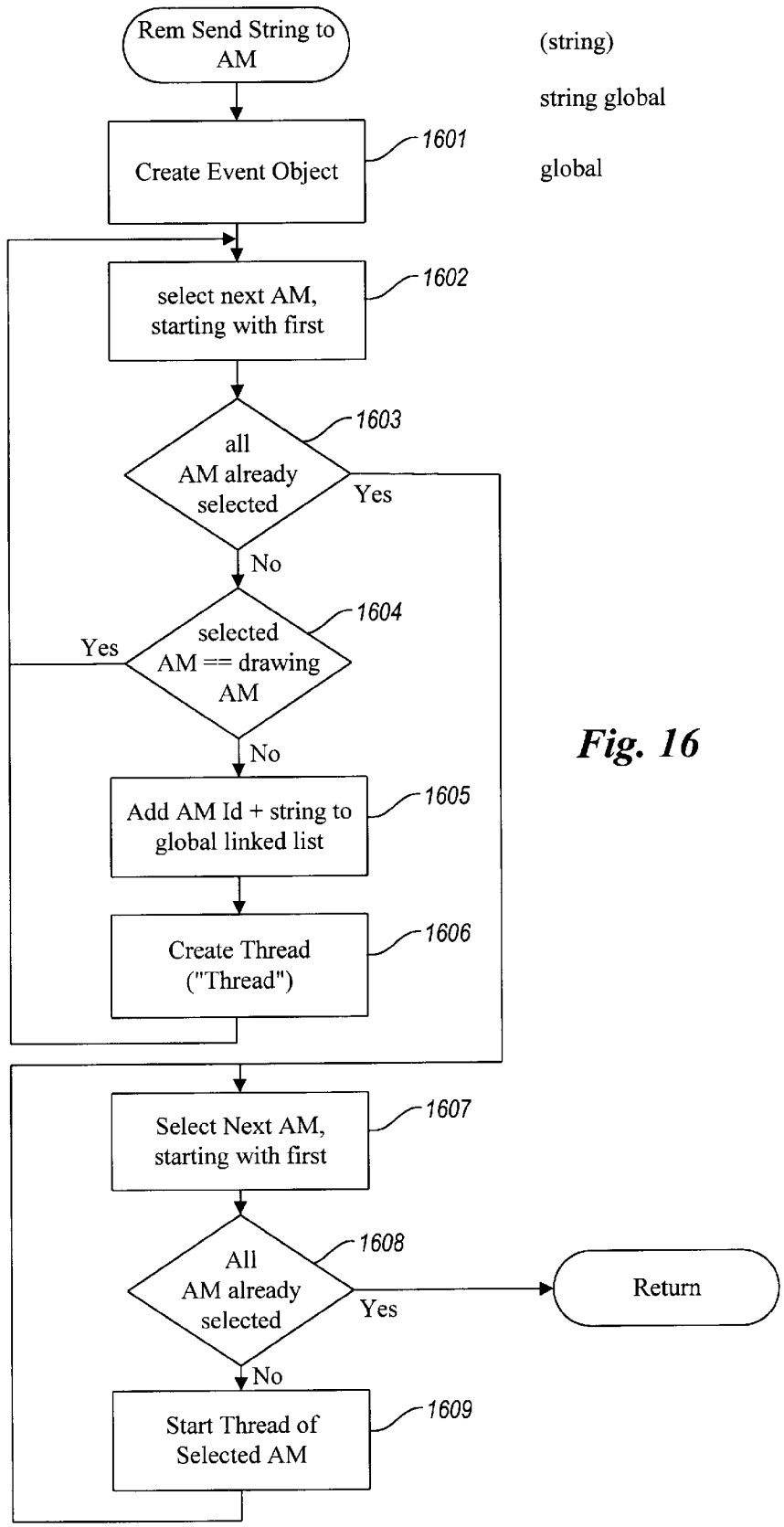
FIG. 16 is a flow diagram of the procedure RemSendStringToAM.

FIG. 16 is a flow diagram of the procedure RemSendStringToAM. The procedure RemSendStringToAM is passed a string. The procedure creates a thread for each audience member in which it sends the passed string to the audience member. In step 1601, the procedure creates a WIN32 event object. The event object is used by the thread to indicate completion of the sending. In steps 1602–1606, the procedure loops creating a thread for each AM object. In step 1602, the procedure selects the next AM object starting with the first. In step 1603, if all the AM objects have already been selected, then the procedure continues at step 1607, else the procedure continues at step 1604. In step 1604, if the string contains drawing data and the selected AM object corresponds to the audience member that sent the drawing data, then the procedure has no need to send the string to that audience member corresponding to the AM object and loops to step 1602, else the procedure continues at step 1605. In step 1605, the procedure adds an entry with an indication of the selected AM object and the string to a global link list. In step 1606, the procedure creates, but does not start, a thread for the selected AM object, and loops to step 1602 to select the next AM object. The global linked list is used to pass data to the threads. When a thread is started, it removes one entry from the global linked list and sends the string to the indicated audience member. The procedure does not start the threads until after the global linked list is filled to avoid problems associated with multiple threads accessing the list. In steps 1607–1609, the procedure loops starting the threads. In step 1607, the procedure selects the next AM object starting with the first. In step 1608, if all the AM objects have already been selected, then the procedure sets the event object and returns, else the procedure continues at step 1609. In step 1609, the procedure starts the thread for the selected AM object and loops to step 1607 to select the next AM object.

RemSendStringToP

Figure 17:
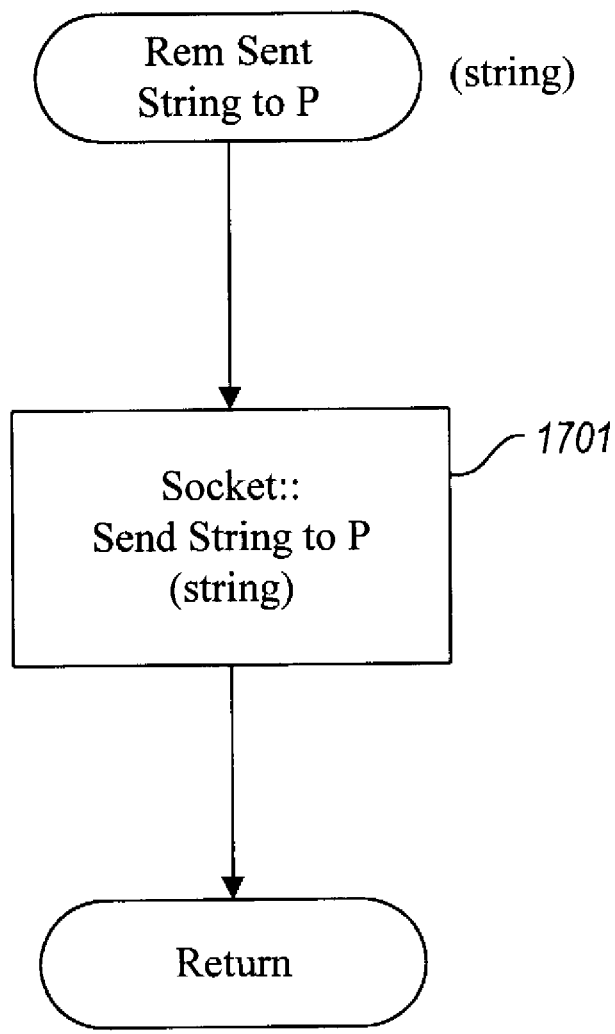
FIG. 17 is a flow diagram of the procedure RemSendStringToP.

FIG. 17 is a flow diagram of the procedure RemSendStringToP. The procedure RemSendStringToP is passed a string and sends the string to the presenter. This procedure is invoked by the audience members. In step 1701, the procedure invokes the method SendStringToP of the socket object passing the passed string and then returns.

RemSetCWWindow

Figure 18:
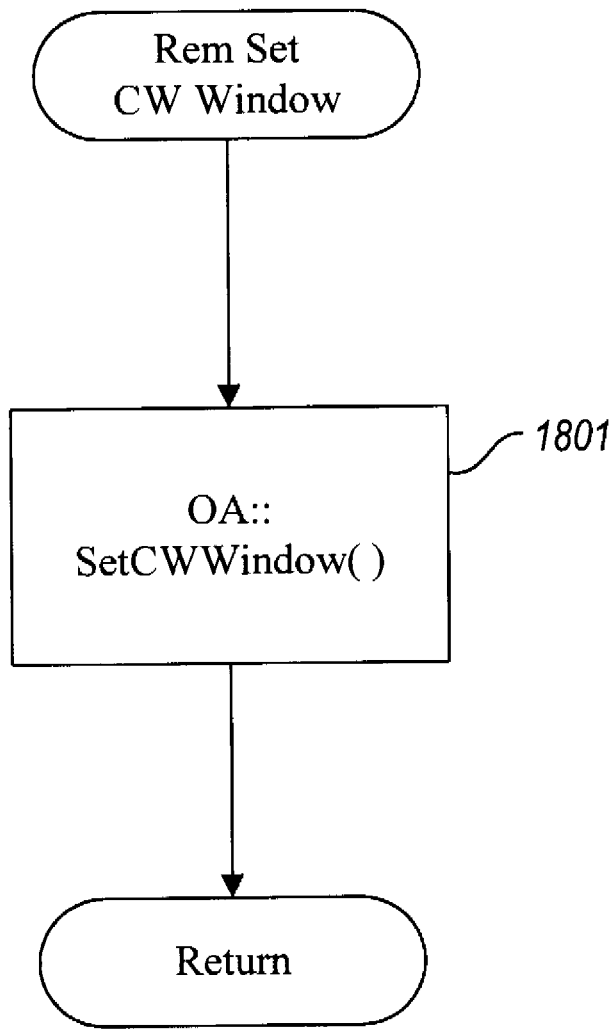
FIG. 18 is a flow diagram of the procedure RemSetCWWindow.

FIG. 18 is a flow diagram of the procedure RemSetCWWindow. The procedure RemSetCWWindow sets the window ID of the conference window. In a preferred embodiment, multiple presentations may be shown in separate windows. Thus, each window has its own identifier. In step 1801, the procedure invokes the method SetCWWindow of the OA object to set the window ID and returns.

RemInstallTrackerForP

Figure 19:
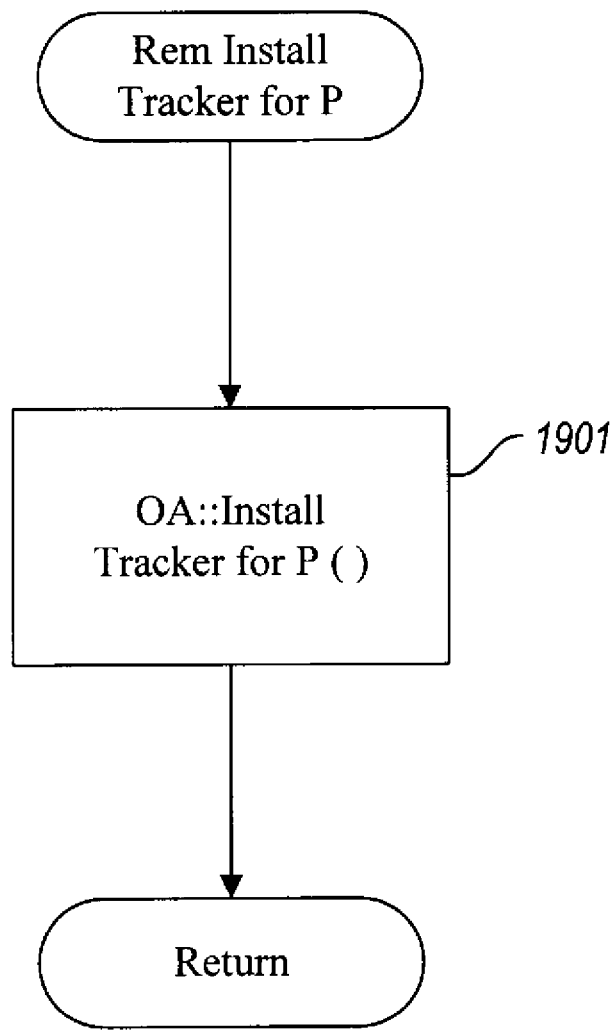
FIG. 19 is a flow diagram of the procedure ReminstallTrackerForP.

FIG. 19 is a flow diagram of the procedure RemInstallTrackerForP. The procedure RemInstallTrackerForP installs a tracker object for the presenter. The tracker is an application-specific OLE automation object for providing coordinates of the points when the conferee draws on the presentation. In step 1901, the procedure invokes the method InstallTrackerForP for the OA object and returns.

RemDisconnectFromAM

Figure 20:
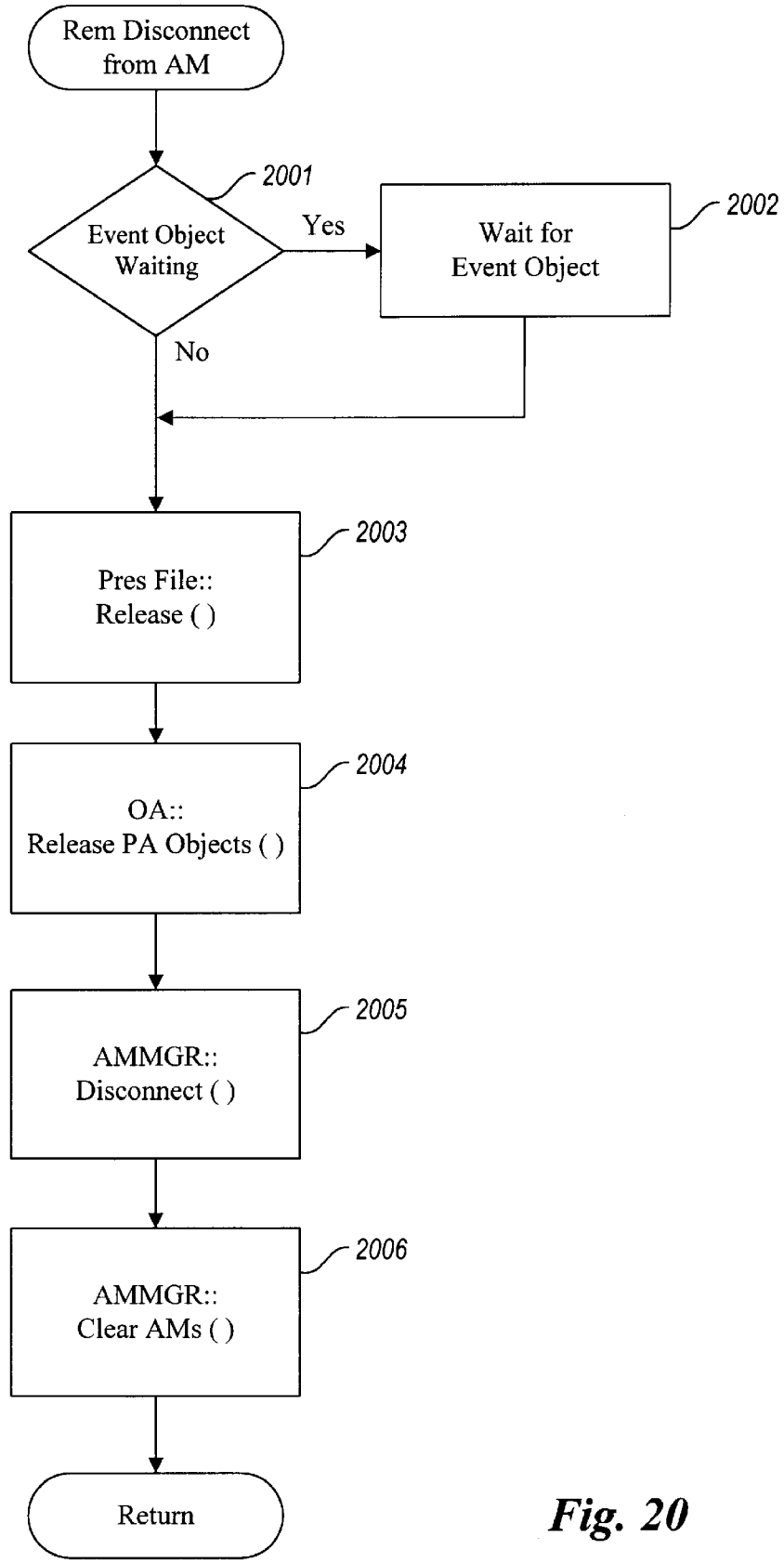
FIG. 20 is a flow diagram of the procedure RemDisconnectFromAM.

FIG. 20 is a flow diagram of the procedure RemDisconnectFromAM. The procedure RemDisconnectFromAM is invoked by the presenter when the presenter ends the presentation to disconnect all audience members. In step 2001, if the event object is currently blocking, then the procedure continues at step 2002 to wait for the event object. This ensures that all activity related to an audience member in another thread is complete before disconnecting. In step 2003, the procedure calls the method Release of the presentation file object to destroy that object. In step 2004, the procedure calls the method ReleaseReferenced-PAObjects of the OA object to decrement the reference count. In step 2005, the procedure calls the method Disconnect of the AMMgr object to disconnect all the audience members. In step 2006, the procedure calls the method ClearAM of the AMMgr object to reset all the variables in CServerManager and to delete memory blocks.

RemDisconnectFromP

Figure 21:
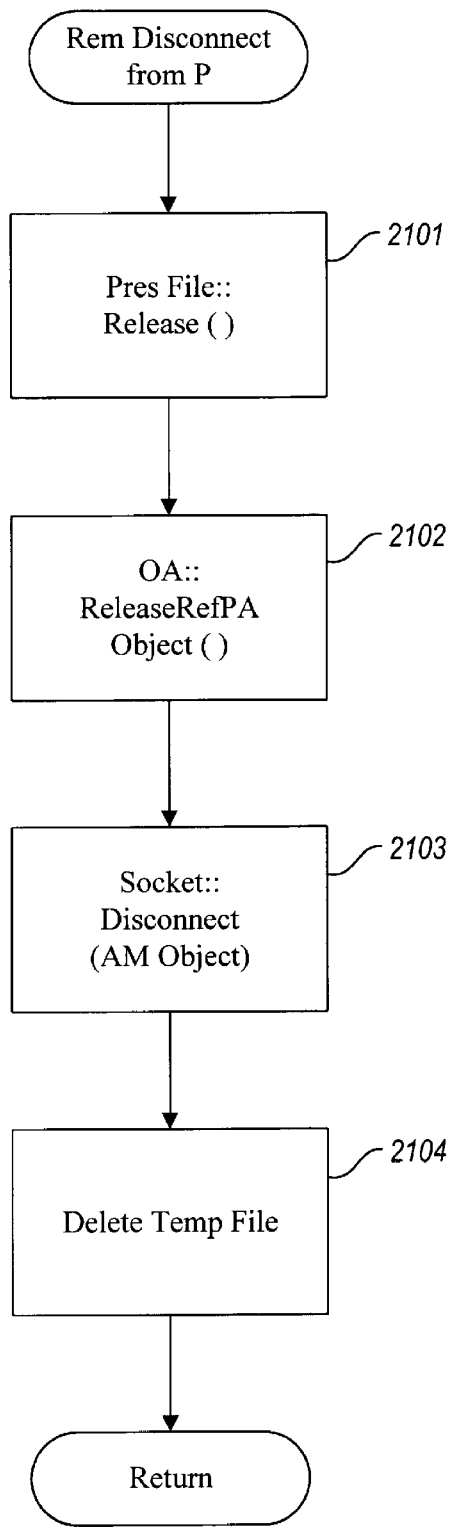
FIG. 21 is a flow diagram of the procedure RemDisconnectFromP.

FIG. 21 is a flow diagram of the procedure RemDisconnectFromP. The procedure RemDisconnectFromP is invoked by an audience member to disconnect from the presenter. In step 2101, the procedure invokes the method Release of the presentation file object to destroy that object. In step 2102, the procedure invokes the method ReleaseReferencedPAObjects of the OA object. In step 2107, the procedure calls the Disconnect method of the socket object passing the global AM object. In step 2104, the procedure deletes the temporary conference file and returns.

RemInitAMListening

Figure 22:
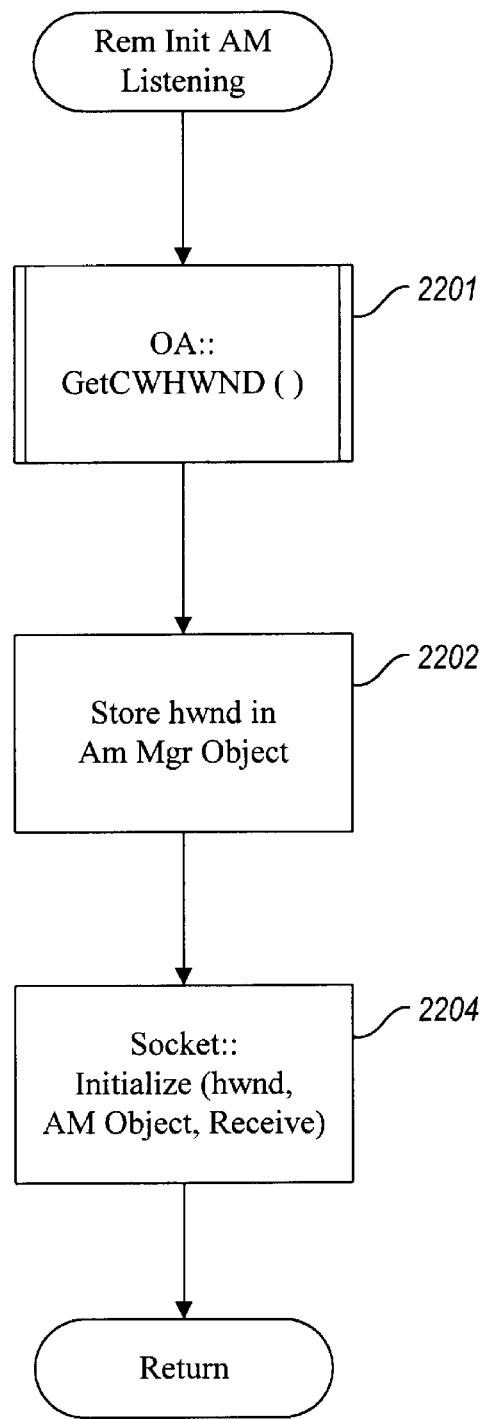
FIG. 22 is a flow diagram of the procedure RemInitAMListening.

FIG. 22 is a flow diagram of the procedure RemInitAMListening. The procedure RemInitAMListening is called by the audience member to initialize listening for commands from the presenter. In step 2201, the procedure invokes the method GetCWHWND of the OA object to retrieve the handle of the presentation window. In step 2202, the procedure stores the window handle in the AMMgr object. In step 2204, the procedure invokes the method Initialize of the socket object passing the window handle, the global AM object, and an indication that the socket is to receive data and returns.

RemReadSocket

Figure 23:
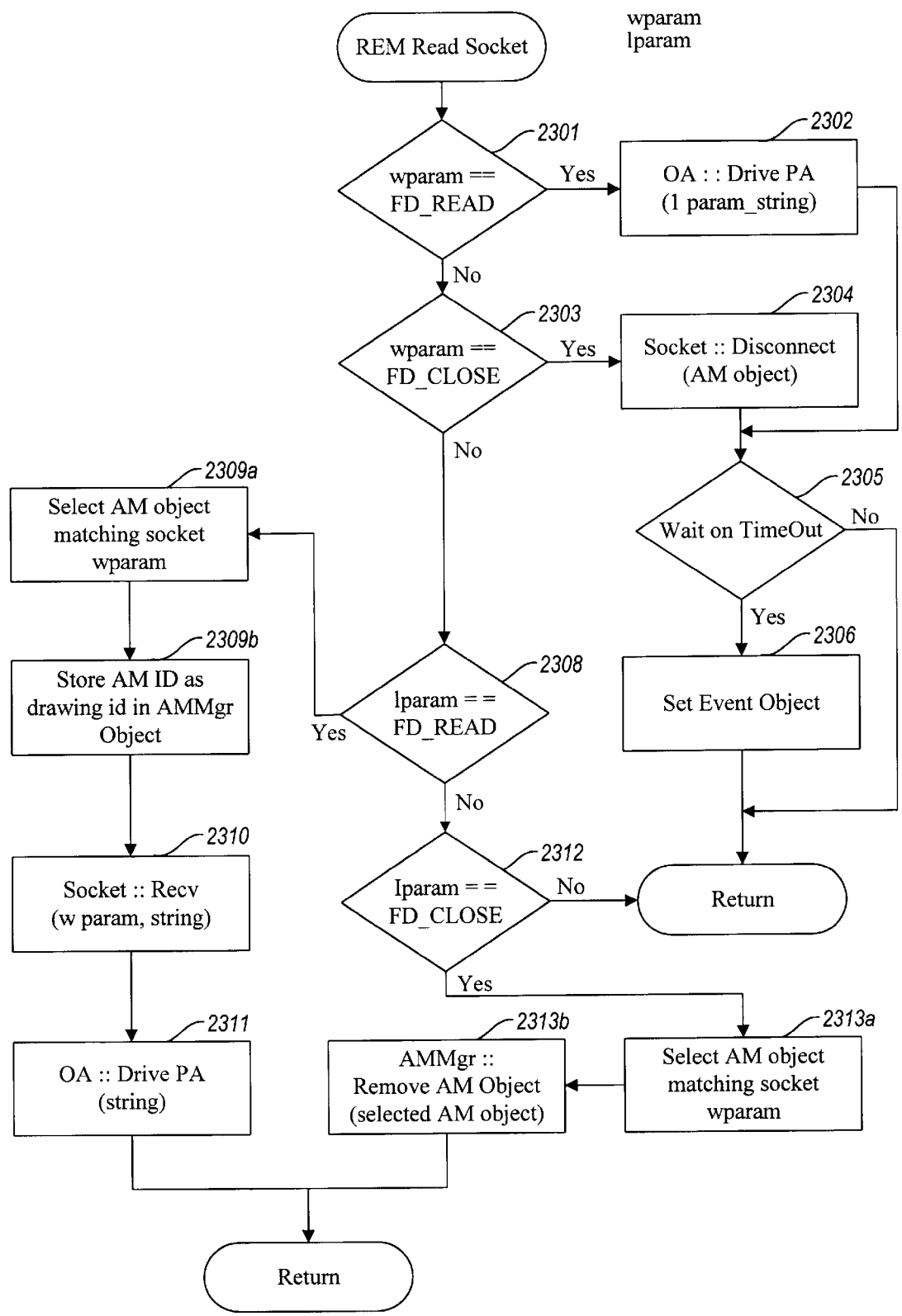
FIG. 23 is a flow diagram of the procedure RemReadSocket.

FIG. 23 is a flow diagram of the procedure RemReadSocket. This procedure is called from the conference window procedure when a "WM_PCREADSOCKET" message is received. This message is an indication that data is to be read from the socket indicated in the passed parameters. As discussed above, all the OLE automation commands are to be executed in the main thread of the presentation application. The procedure is passed two parameters, WPARAM and LPARAM, which correspond to the parameters sent with the message to the window procedure. The procedure processes requests to execute commands when the conferee is the presenter in steps 2301–2306, and when the conferee is an audience member in steps 2307–2313. In step 2301, if the WPARAM parameter equals "FD_READ," then the procedure continues at step 2302, else the procedure continues at step 2303. In step 2302, the procedure invokes the method DrivePA of the OA object passing the string pointed to by the parameter LPARAM. In step 2303, if the parameter WPARAM equals "FD_CLOSE," then the procedure continues at step 2304, else the procedure continues at step 2308. In step 2304, the procedure invokes the method Disconnect of the socket object passing the global AM object. In step 2305, if the parameter LPARAM points to an event object that is waiting on a time out, then the procedure continues at step 2306, else the procedure returns. In step 2306, the procedure sets the event object and returns. In step 2309a, the procedure selects the AM object that matches the socket value in the parameter WPARAM. In step 2308, if the parameter LPARAM equals "FD_READ," then the procedure continues at step 2309a, else the procedure continues at step 2312. In step 2309a, the procedure selects the AM object that matches the socket value in the parameter WPATRAM. In step 2309b, the procedure stores an indication of the AM object as the identification of the caller in the AMMgr object so that drawing data is not sent to the originating audience member. In step 2310, the procedure invokes the method Recv of the socket object passing the parameter WPARAM, which identifies the socket, and receives the string. In step 2311, the procedure invokes the method DrivePA of the OA object passing the string and returns. In step 2312, if the parameter LPARAM equals "FD_CLOSE," then the procedure continues at step 2313, else the procedure returns. In step 2313a, the procedure selects the AM object that matches the socket value in the parameter WPARAM. In step 2313b, the procedure invokes the method RemoveAMObject of the AMMgr object passing the selected AM object and then returns.

SendThread

Figure 24:
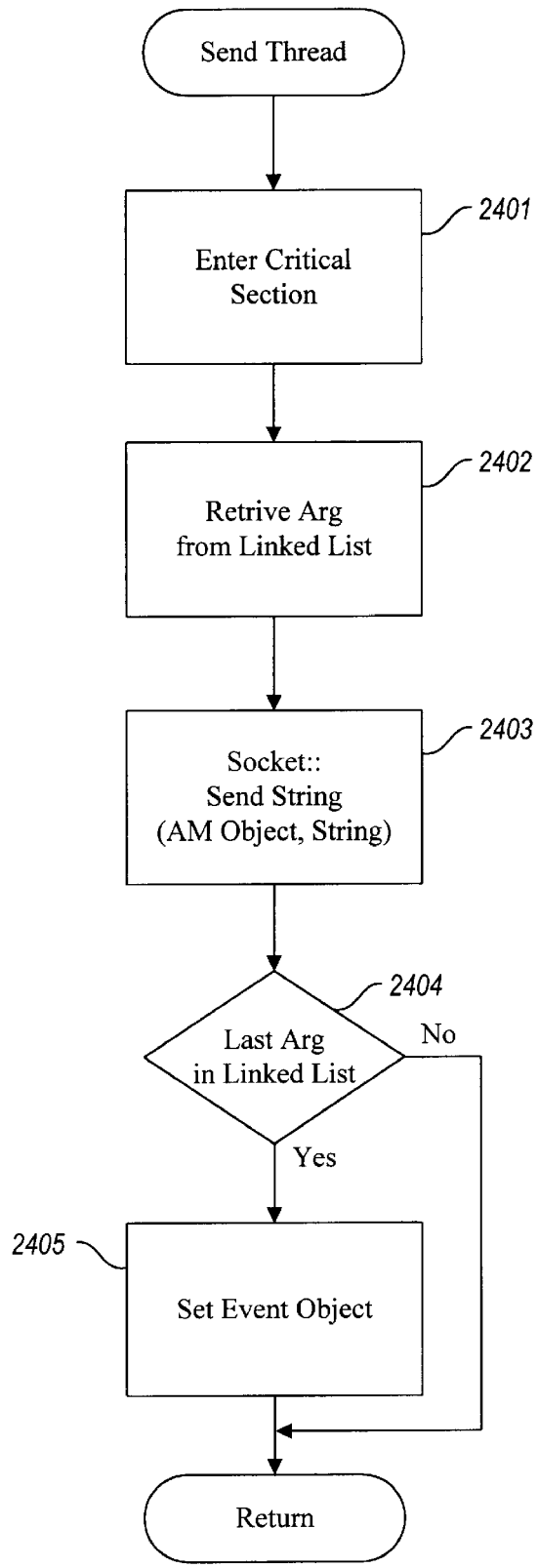
FIG. 24 is a flow diagram of the "SendThread."

FIG. 24 is a flow diagram of the "SendThread." The send thread is created by the presenter for each audience member whenever data is to be sent to the audience members. The send thread controls the sending of the data to the audience member. The data to be passed to the audience member is stored in a global link list that consists of entries with an indication of the audience member and the string to send. In step 2401, the thread identifies the following code as a critical section. In step 2402, the thread retrieves the next entry from the link list and updates a pointer to the next entry. In step 2403, the thread invokes the method SendString of the socket object passing the AM object corresponding to the audience member identified in the removed entry and the string to send to the audience member. In step 2404, if the last entry of the link list has been removed, then the thread sets the event object in step 2405 to indicate completion of the sending to all the audience members. The thread then leaves and returns.

ListenThread

Figure 25:
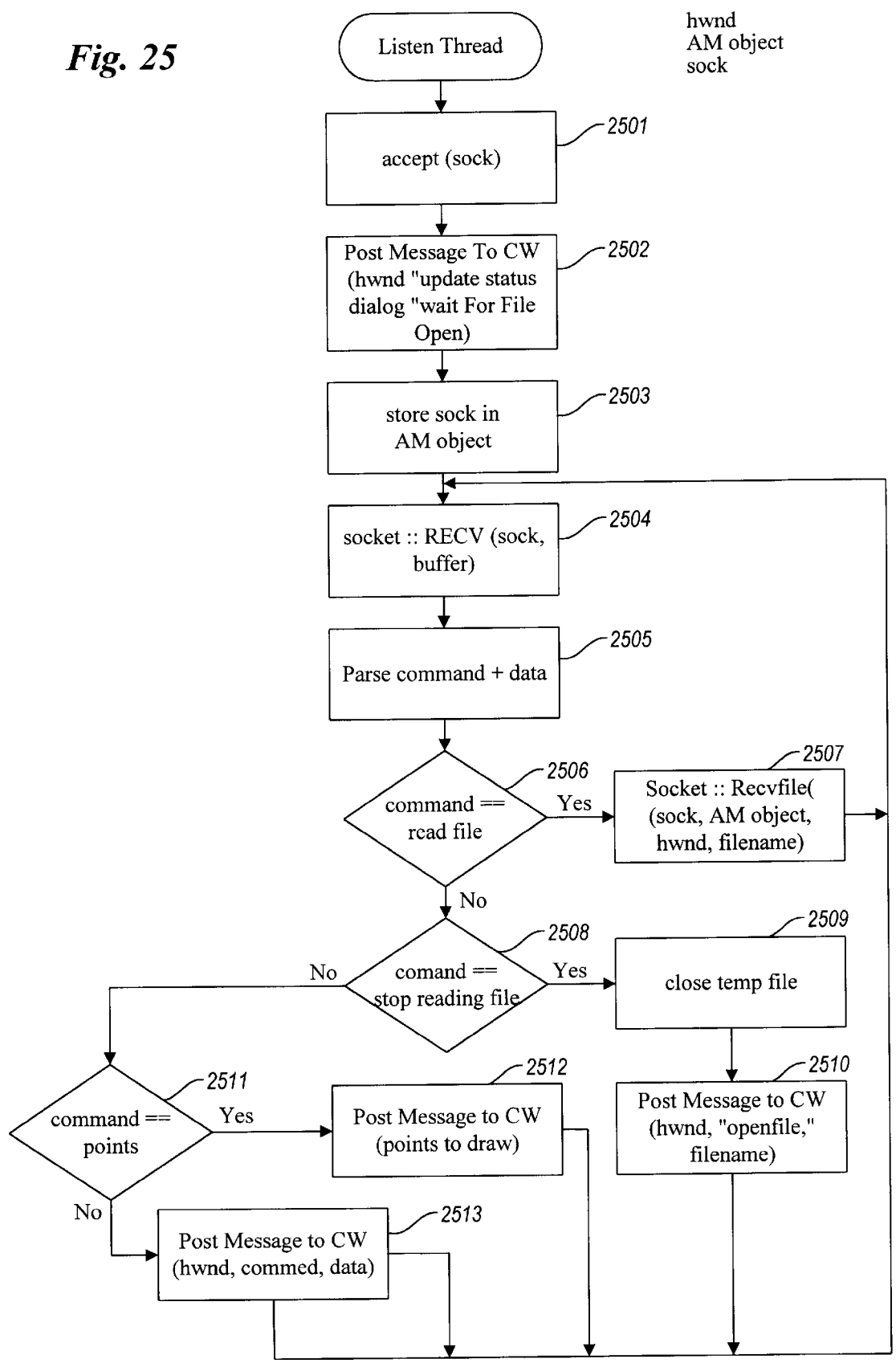
FIG. 25 is a flow diagram of the "ListenThread."

FIG. 25 is a flow diagram of the "ListenThread." The listen thread is passed the conference window handle, an indication of an audience member, and an indication of the socket. The thread loops waiting for data on the passed socket and then posts messages to the conference window procedure. In step 2501, the thread accepts the socket. In step 2502, the thread invokes the procedure PostMessageToCW (described below) passing conference window handle and indicating that the status dialog is to be updated. In step 2503, the procedure stores the socket handle in the passed audience member object. In steps 2504–2513, the thread enters an infinite loop receiving messages on the socket. In this loop, the thread makes a synchronous (blocking) call to the socket. This blocking call in the thread minimizes the window messages that are handled by the presentation application and improves overall performance of the system. In step 2504, the thread invokes the method recv of the socket to receive the message into a buffer. In step 2505, the thread parses the buffer into its commands and parameters. In step 2506, if the command is to read a file, then the thread continues at step 2507, else the thread continues at step 2508. In step 2507, the thread invokes the method RecvFile of the socket object and loops to step 2504. In step 2508, if the command is to stop reading the file, then the thread continues at step 2509, else the thread continues at step 2511. In step 2509, the thread closes the open temporary file that contains the read file. In step 2510, the thread invokes the procedure PostMessageToCW to update the status dialog to indicate that the file has been successfully read, and loops to step 2504. In step 2511, if the command is to send points, then the thread continues at step 2512, else the thread continues at step 2513. In step 2512, the thread invokes the procedure PostMessagetoCW passing the points and loops to step 2504. In step 2513, the thread invokes the procedure PostMessageToCW to direct the conference window to perform the command, and loops to step 2504.

PostMessagetoCW

Figure 26:
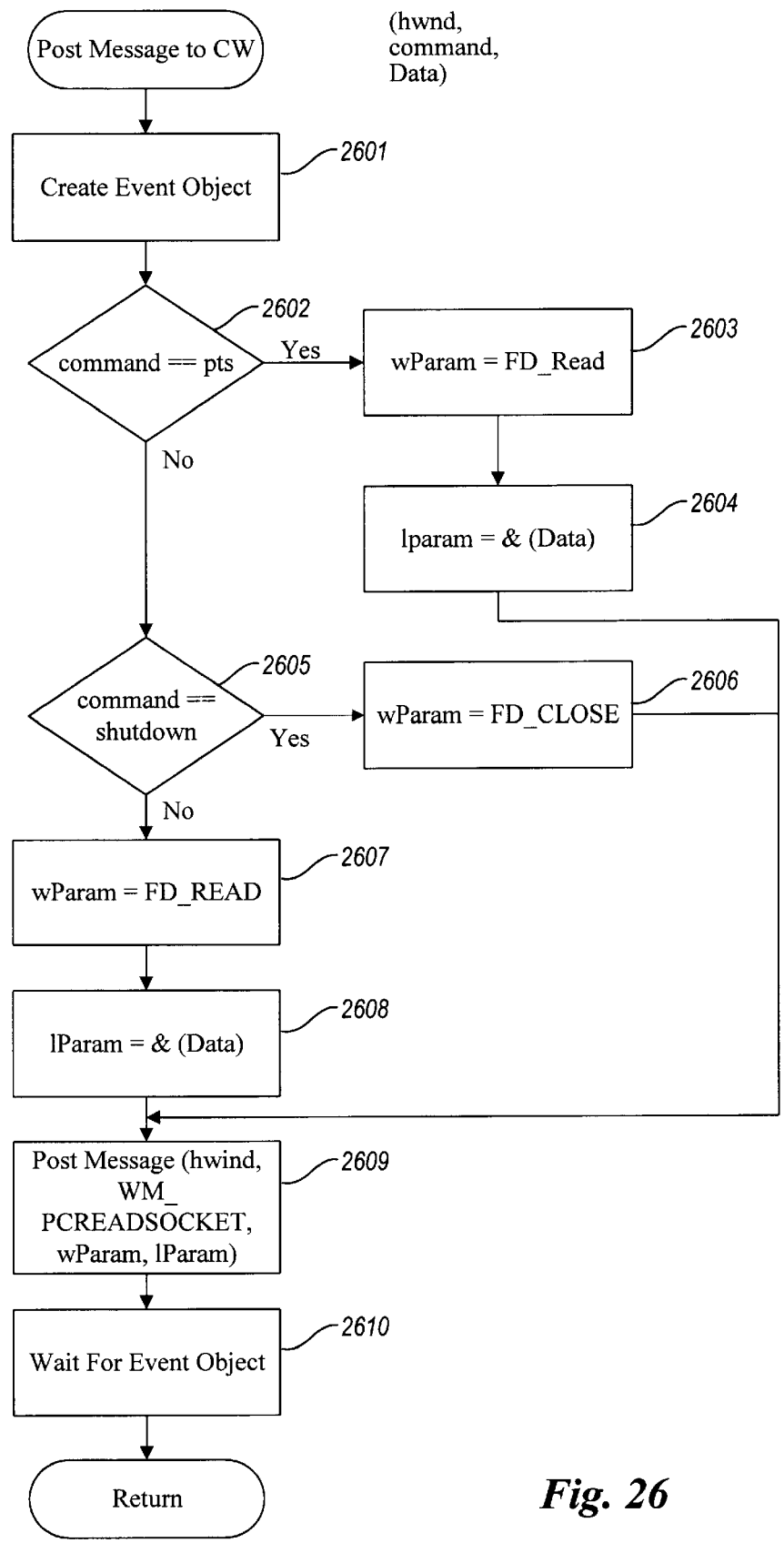
FIG. 26 is a flow diagram of the procedure PostMessagetoCW.

FIG. 26 is a flow diagram of the procedure PostMessagetoCW. The procedure PostMessagetoCW is invoked to post messages to the main conference window thread. In step 2601, the procedure creates an event object which will block the caller until the main thread has performed the command. In step 2602, if the command indicates that a buffer of points has been passed, then the procedure continues at step 2603, else the procedure continues at step 2605. In steps 2603–2604, the procedure initializes parameters to send to the conference window. In step 2605, if the command indicates a shutdown, then the procedure continues at step 2606, else the procedure continues at step 2607. In step 2606, the procedure initializes the parameters to indicate a shutdown. In steps 2607–2608, the procedure initializes the parameters. After the parameters have been initialized, in step 2609 the procedure posts the message with the parameters to the conference window. In step 2610, the procedure, which is executed in the listen thread, waits for the event object to indicate that the task has been performed in the main thread of the presentation application, and then returns.

OA Object

The OA object provides the OLE automation interface between the conference subsystem and the presentation application. The OA object provides the methods for parsing a message sent from another conferee and invoking the appropriate exposed methods of the presentation application to perform the behavior of the message. The window procedure for the conference window (i.e., the main application thread) invokes these methods to direct the performing of the behavior (e.g., select next slide). The OA object provides a method named DrivePA and a method for each of the various behaviors to be performed. The method DrivePA invokes the appropriate method of the interfaces exposed by the presentation application to perform the behavior.

OA::DrivePA

Figure 27:
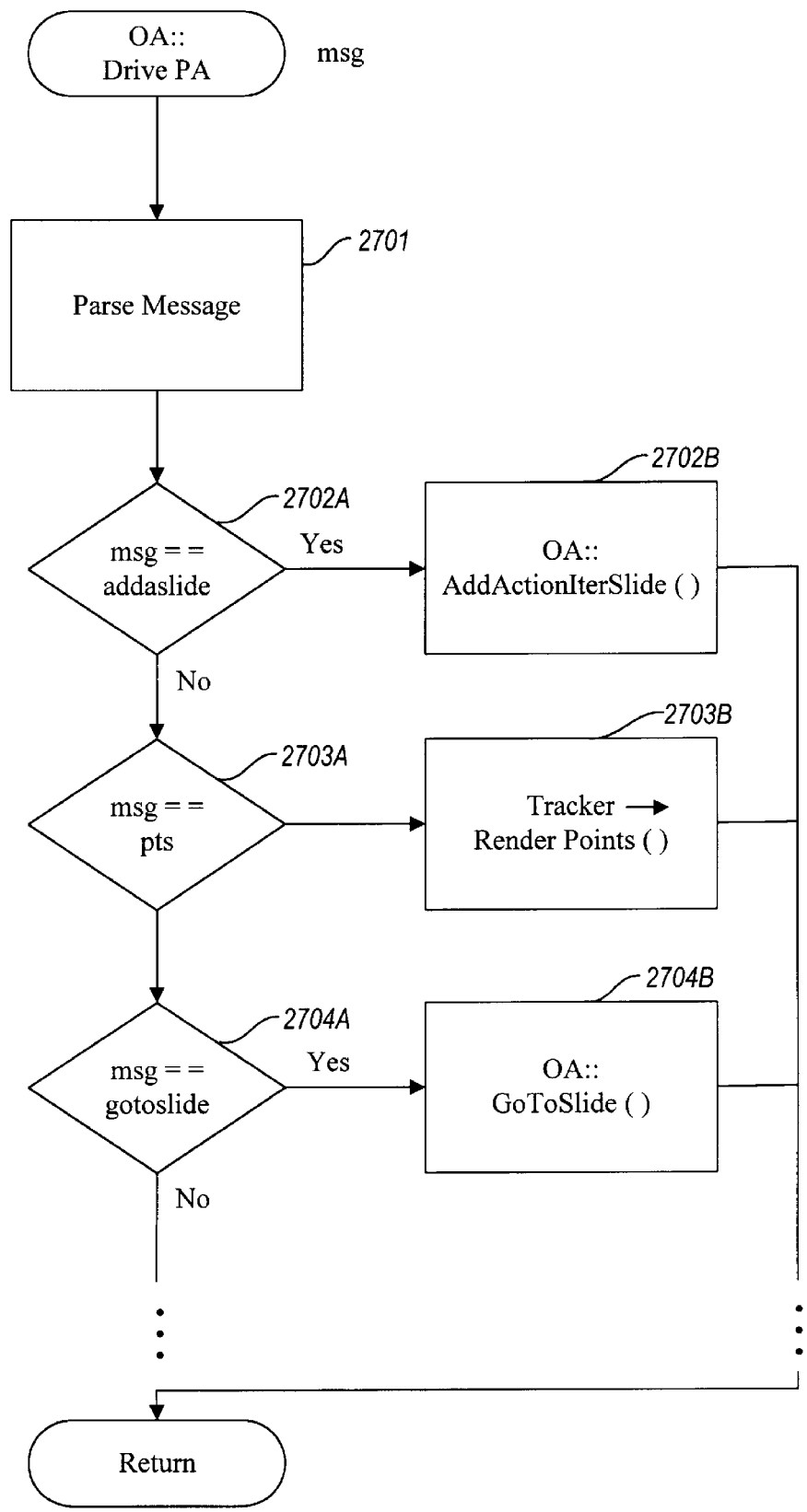
FIG. 27 is a flow diagram of the method OA::DrivePA.

FIG. 27 is a flow diagram of the method OA::DrivePA. The method DrivePA is passed a message that indicates the behavior to perform. The method parses the message and directs the performance of the behavior associated with the message. Steps 2702A, 2703A, and 2704A illustrate typical processing to identify the message. Steps 2702B, 2703B, and 2704B illustrate the invoking of other methods to perform the behavior. The ellipses indicate that a variety of other messages can be supported depending on the overall capabilities provided. In step 2701, the method parses the message. In step 2702A, if the message indicates to add an action item slide, then the method continues at step 2702B, else the method continues at step 2703A. In step 2702B, the method invokes the method AddActionItemSlide of the OA object passing the message to direct the presentation application to add an action item slide. In step 2703A, if the message indicates a buffer of points has been received, then the method continues at step 2703B, else the method continues at step 2704A. In step 2703B, the method invokes the method RenderedPoints of the tracker object to render the buffer on the conference window. In step 2704A, if the message indicates to go to a slide, then the method continues at step 2704B. In step 2704B, the method invokes the method GoToSlide of the OA object to direct the presentation application to go to the passed slide number. The method then returns.

OA::GoToSlide

Figure 28:
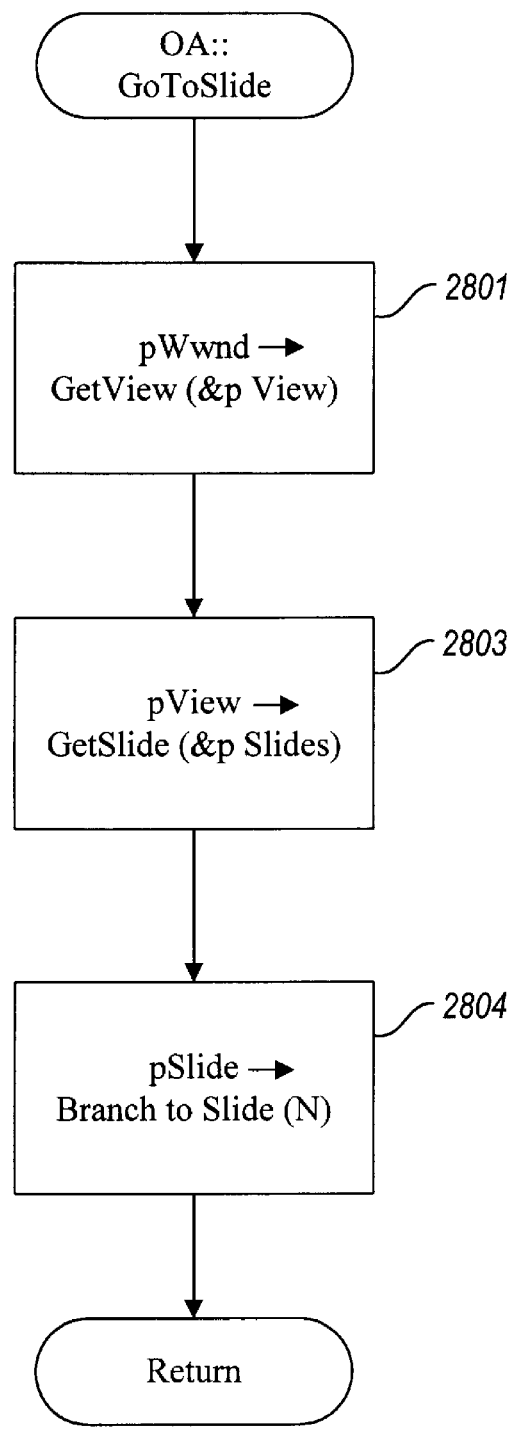
FIG. 28 is a flow diagram of the method OA::GoToSlide.

FIG. 28 is a flow diagram of the method OA::GoToSlide. The method GoToSlide is an example of typical processing performed by the methods of the OA object to perform the behavior of the corresponding message. Each of these methods request the appropriate interface from the presentation application and then invokes the methods to perform the behavior. In step 2801, the method invokes the method GetView of the conference window to retrieve a view interface. In step 2803, the method invokes the method GetSlide of the view interface to retrieve a pointer to the slide interface. In step 2804, the method invokes the method BranchToSlide of the slide interface passing the slide number to which the presentation application is to display. The method then returns.

AMMgr Object

Each conferee has an instance of an AMMgr object. However, the object is primarily used by the presenter to manage the audience members. The object contains an array of pointers to an AM object for each audience member. The AMMgr object also contains a reference to the socket object, a reference to the OA object, a reference to the conference file object, and an array of pointers to threads created for sending strings to the audience members. The AMMgr object also has member functions for managing the server objects and other data.

Socket Object

The socket object provides an interface between the function provided by the operating system for socket management and the conference subsystem. In a preferred embodiment, the socket management is provided as WinSock version 1.1 by Microsoft Corporation.

Socket:Initialize

Figure 29:
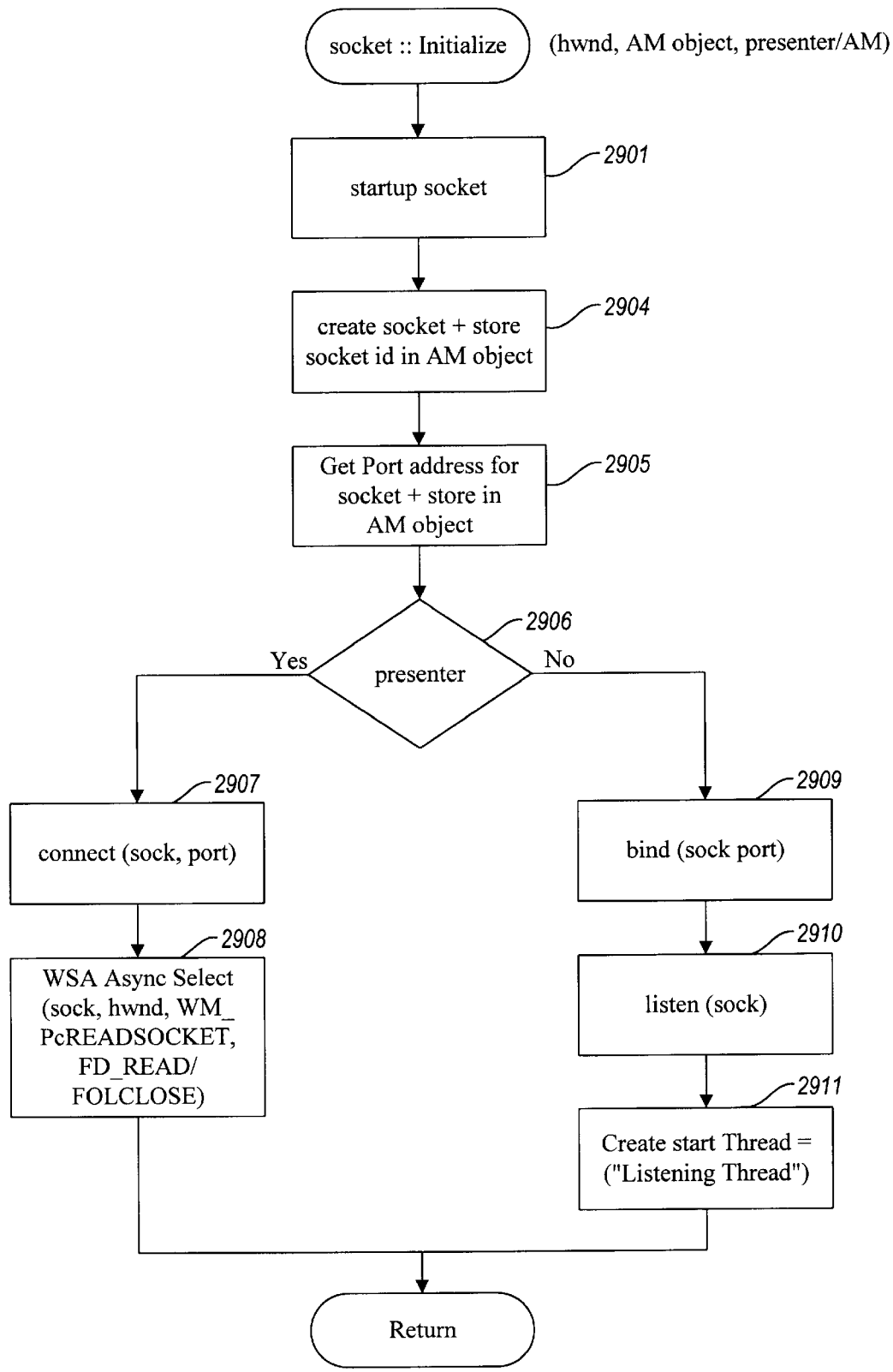
FIG. 29 is a flow diagram of the method Socket::Initialize.

FIG. 29 is a flow diagram of the method Socket::Initialize. The method Initialize is passed the conference window handle, an indication of an audience member and an indication as to whether the socket is to be initialized as an audience member or presenter. The presenter socket is initialized to be asynchronous and the audience member socket is initialized to be synchronous. The use of the synchronous sockets with audience members allows for easier integration of the conference subsystem into the application. A thread provided by the conference subsystem handles the interface with the socket and post only relevant messages to the application. Alternatively, the window procedure of the application would need to be more complex to handle all the socket messages. In step 2901, the procedure invokes a function WSAStartup to start the socket. In step 2904, the procedure creates the socket and stores an identification of the socket in the passed audience member object. In step 2905, the method retrieves the socket address (e.g., port identification) from the audience member object. In step 2906, if this is the presenter, then the method continues at step 2907, else the method continues at step 2909. In step 2907, the method connects the created socket to the socket address. In step 2908, the procedure selects an asynchronous mode for receiving data on the socket and returns. In step 2909, the method binds the socket to the socket address. In step 2910, the method invokes the function to listen for the socket. In step 2911, the method creates the thread Listening Thread and returns.

Tracker Object

The Tracker object is used by both the presenter and the audience members to track freehand data that is drawn on a presentation window. At initialization, a Tracker object is registered with the presentation application. The Tracker object provides the methods for tracking each data point to be drawn on a window by an input device such as a pen or mouse, draws the data point on the window and stores the data point in a buffer. When the drawing is complete, as indicated by, for example, a mouse button up, the Tracker object then forwards the accumulated buffer of points to the other conferees. If the presenter is drawing, then the buffer of points is sent to each audience member. If, however, an audience member is drawing, then the buffer of points is sent to the presenter to then be sent to the other audience members.

The Tracker object also controls the receiving of a buffer of points from another conferee. When a buffer of points is received, the conferee invokes the Tracker object to render the points.

Tracker::OnTrack

Figure 30:
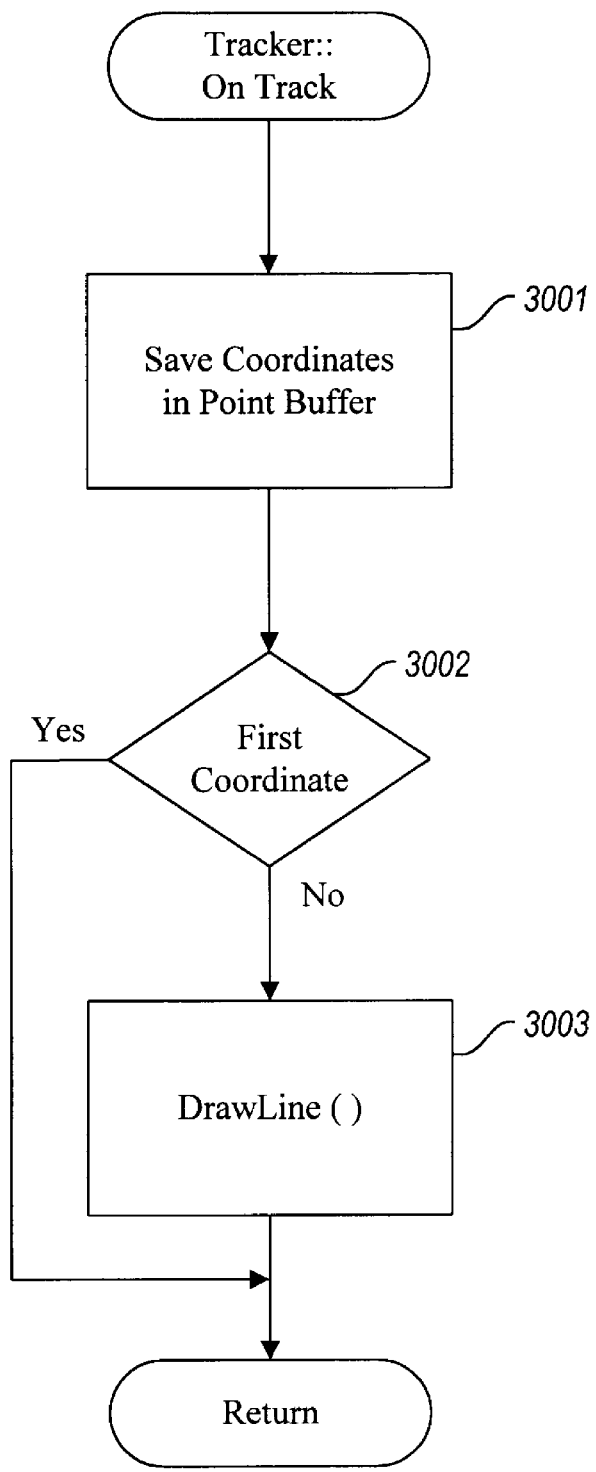
FIG. 30 is a flow diagram of the method Tracker::OnTrack.

FIG. 30 is a flow diagram of the method Tracker::OnTrack. The method OnTrack is passed the coordinate corresponding to a point drawn by the conferee. The method saves the coordinate in a buffer and draws a line from the previous coordinate to the current coordinate. In step 3001, the method saves the coordinates in a point buffer. In step 3002, if the passed coordinate is the first coordinate of the point buffer, then no line needs to be drawn and the method returns, else the method continues at step 3003. In step 3003, the method directs the presentation application to draw a line from the previous coordinate to the passed coordinate. The method then returns.

Tracker::EndTrack

Figure 31:
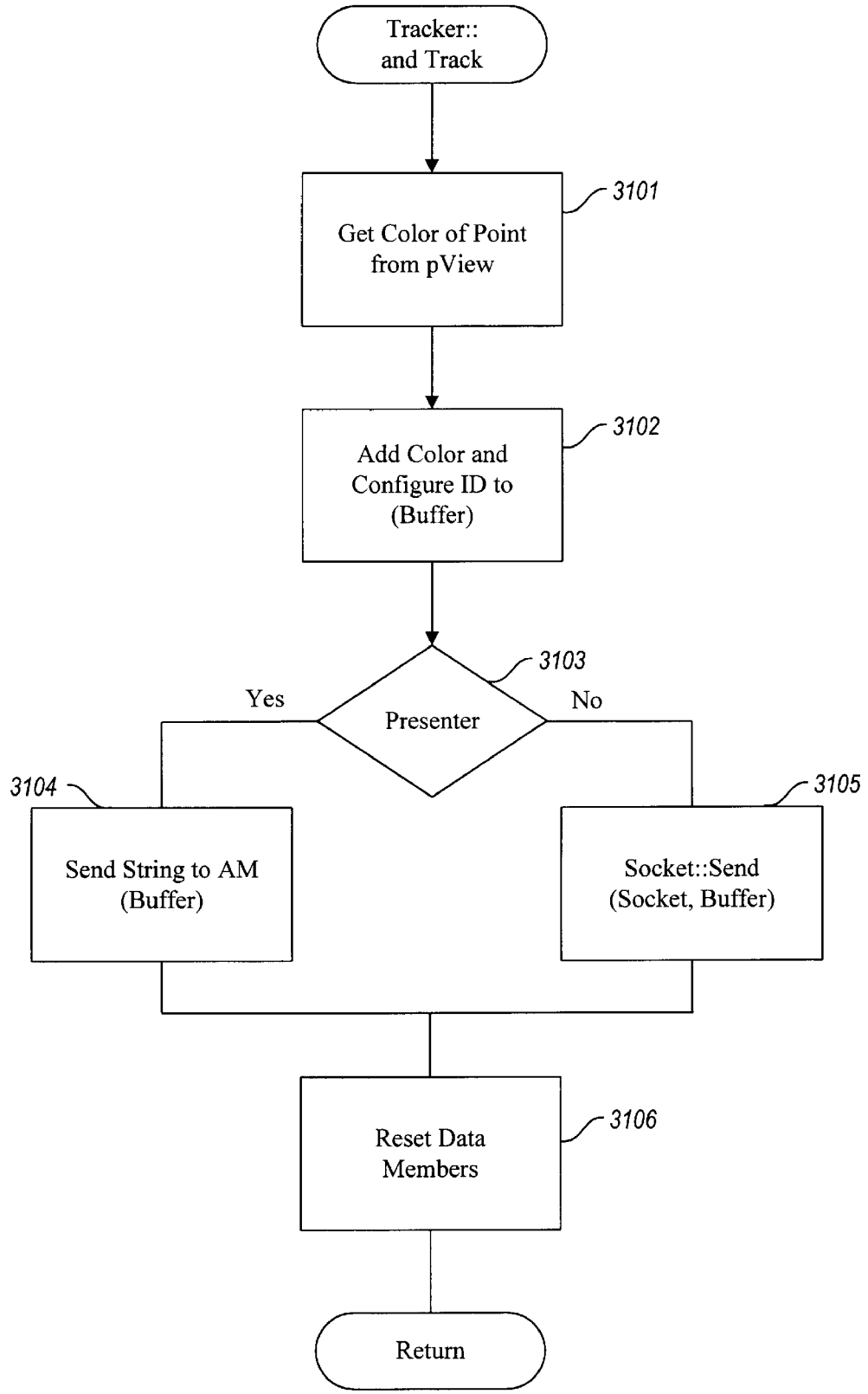
FIG. 31 is a flow diagram of the method Tracker::EndTrack.

FIG. 31 is a flow diagram of the method Tracker::EndTrack. The method EndTrack is passed a coordinate corresponding to the end of a line. The method packages the current color for drawing, the conferee's identification, and the point buffer. The package is either sent to the presenter if an audience member has drawn the line, or sent to each audience member if the presenter has drawn the line. In step 3101, the method retrieves the color in which the points were drawn from the presentation application. In step 3102, the method adds the color and an indication of the conferee to the buffer of points. In step 3103, if the presenter drew the line, then the method continues at step 3104, else a method continues at step 3105. In step 3104, the method invokes the procedure RemSendStringToAM passing the point buffer to send the buffer to the audience members. In step 3105, the method sends the point buffer to the presenter. In step 3106, the method resets the data members of the tracker object to indicate that the point buffer has been transmitted.

Tracker::OnRemoteTrack

Figure 32:
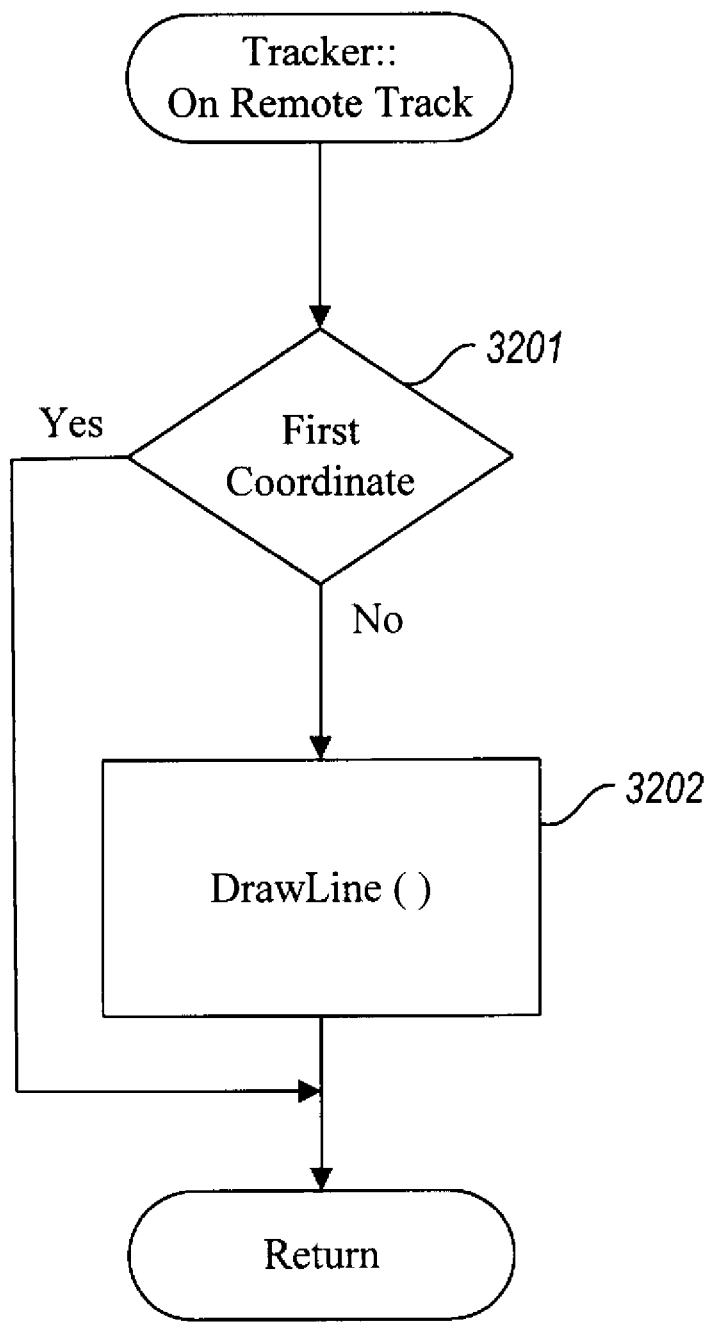
FIG. 32 is a flow diagram of the method Tracker::OnRemoteTrack.

FIG. 32 is a flow diagram of the method Tracker::OnRemoteTrack. The method OnRemoteTrack is passed the coordinate of a point that has been received from another conference. The method draws a line from the last point received to the passed point on the window of the presentation application. In step 3201, if the passed coordinate is the first coordinate received, then the method returns, else the method continues at step 3202. In step 3202 the method invokes the method draw a line on the window passing the last coordinate received and the passed coordinate, and then returns.

Tracker::EndRemoteTrack

Figure 33:
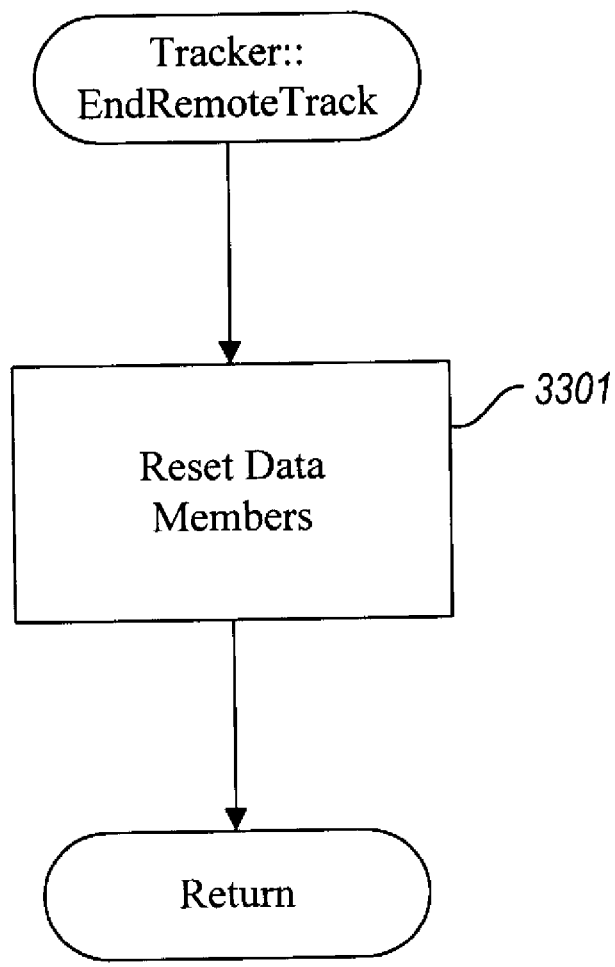
FIG. 33 is a flow diagram of the method Tracker::EndRemoteTrack.

FIG. 33 is a flow diagram of the method Tracker::EndRemoteTrack. The method EndRemoteTrack resets the data members in step 3301 to indicate that the end of the drawn data has been reached and returns.

Tracker::RenderPoints

Figure 34:
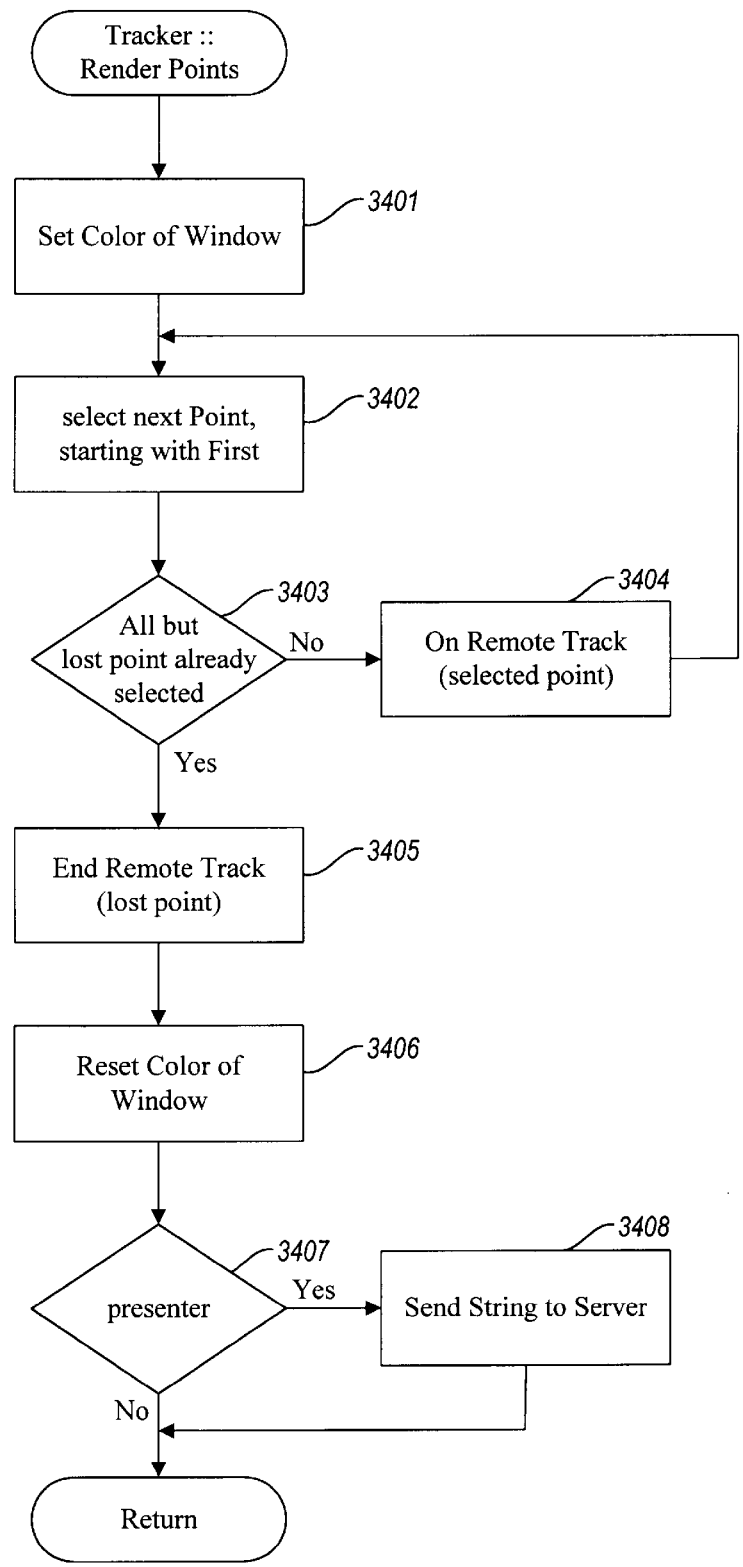
FIG. 34 is a flow diagram of the method Tracker::RenderPoints.

FIG. 34 is a flow diagram of the method Tracker::RenderPoints. The method RenderPoints is passed a buffer of points that was received from another conferee. The method renders those points on the window of the presentation application. In step 3401, the method sets the color of the line to be drawn of the current presentation application based on the data in the passed buffer. In steps 3402–3404, the method loops selecting each point in the buffer and invoking the method OnRemoteTrack to draw the point. In step 3402, the method selects the next point starting with the first point. In step 3403, if all but the last point are already selected, then the method continues at step 3405, else the method continues at step 3404. In step 3404, the method invokes the method OnRemoteTrack passing the selected point and loops to step 3402 to select the next point. In step 3405, the method invokes the method EndRemoteTrack passing the last point in the buffer. In step 3406, the method resets the color to the color before this method was invoked. In step 3407, if this conferee is the presenter, then the method continues at step 3408, else the method returns. In step 3408, the method sends the string to the server and returns.

Although the present invention has been described in terms of a preferred embodiment, it is not intended that this invention be limited to this embodiment. Modifications within the spirit of the invention will be apparent to those skilled in the art. The scope of the present invention is defined by the claims that follow.

We claim:

1. A presentation system for simultaneously displaying a presentation at multiple computer systems, one computer system designated as a presenter computer system, the other computer systems designated as audience member computer systems, comprising:

at the presenter computer system,
an instance of an application for controlling the display of a presentation and that exposes a function for controlling behavior of the application and that provides an option for indicating that a presentation is to be displayed simultaneously on multiple computer systems; and
a conference subsystem having a messaging component for sending commands to audience member computer systems, having an automation component for controlling the behavior of the instance of application using the exposed function, and having a user interface component for displaying the presentation within a conference window, for receiving commands from a presenter and sending the commands to each audience member computer system, and for directing the automation component to effect the performing of a behavior of the received commands; and at each audience member computer system,
an instance of the application; and
a conference subsystem having a messaging component for receiving commands from the presenter computer system, having an automation component for controlling the behavior of the instance of application using the exposed function, and having a user interface component for displaying the presentation within a conference window, and for directing the automation component to effect the performing of a behavior of the received commands.

2. The presentation system of claim 1 wherein the messaging component and the user interface component are application independent.

3. The presentation system of claim 1 wherein the automation component is application dependent.

4. The presentation system of claim 1 wherein the application exposes its function using Object Linking and Embedding automation.

5. The presentation system of claim 1 wherein the presentation has a pre-defined sequence and a command received from the presenter is a command to modify the sequence of the presentation.

6. The presentation system of claim 1 wherein the presentation has a pre-defined content and a command received from the presenter is a command to modify the content of the presentation.

7. The presentation system of claim 1 wherein each conferee at a computer system can draw data on the conference window and wherein the drawn data is transferred to each other computer system for display.

8. The presentation system of claim 7 wherein when drawn data is received from another conferee computer system, the receiving computer system uses the exposed function to control the drawing of the received data.

9. The presentation system of claim 1 wherein the message component at the presenter computer system receives commands from the audience member computer systems and directs the automation component to effect the performing of a behavior of the received commands and wherein the message component at the audience member computer system sends commands to the presenter computer system.

10. A method in a computer system for conducting a presentation at a plurality of computer systems, each computer system having an application for conducting the presentation, one computer system designated as a presenter computer system, the other computer systems designated as audience member computer systems, the method comprising:

starting execution of the application at each of the plurality of computer systems, wherein the application exposes its behavior through a function;

transferring a description of the presentation from the presenter computer system to each of the audience member computer systems;

at the presenter computer system,
receiving a command from a presenter to control the executing application to perform behavior of the received command by invoking the function; and
transferring the command to each audience member computer system; and at each audience member computer system, upon receiving the transferred command, directing the executing application to perform behavior of the received command by invoking the function to effect conducting of the application.

11. The method of claim 10 wherein the presentation is displayed in a conference window and wherein at each audience member computer system, receiving data to be drawn on the conference window, transmitting the drawn data to the presenter computer system, and displaying the drawn data on the conference window.

12. The method of claim 11 where in the drawn data is displayed by invoking a function exposed by the executing application.

13. The method of claim 10 wherein at the presenter computer system, receiving data to be drawn on the conference window from an audience member computer system, transmitting the drawn data to other audience member computer systems, and displaying the drawn data on the conference window.

14. The method of claim 13 where in the drawn data is displayed by invoking a function exposed by the executing application.

15. The method of claim 10 wherein the application is a slide show presentation application, and the description of the presentation is a file containing slides.

16. A presentation system for displaying a presentation at multiple computer systems, one computer system designated as a presenter computer system, the other computer systems designated as audience member computer systems, comprising:

an application that exposes a function for controlling the behavior of the application; and
a conference subsystem having a messaging component for controlling communications between the computer systems, having an automation component for controlling the behavior of the application using the exposed function, and having a user interface component for displaying the presentation within a conference window, for receiving commands from a presenter and sending the received commands to each audience member computer system, for receiving commands from the presenter computer system, and for directing the automation component to effect the performing of behavior of the received commands.

17. The presentation system of claim 16 wherein the messaging component and the user interface component are application independent.

18. The presentation system of claim 16 wherein the automation component is application dependent.

19. The presentation system of claim 16 wherein the application exposes its functions using Object Linking and Embedding automation.

20. The presentation system of claim 16 wherein a command received from the presenter is a command to modify the presentation.

21. The presentation system of claim 16 wherein each computer system executes an instance of the same application.

22. The presentation system of claim 16 wherein each audience member can draw data on the conference window and wherein the drawn data is transferred to each other computer system for display.

23. The presentation system of claim 22 wherein the drawn data is displayed by invoking the function exposed by the application.

24. The presentation system of claim 16 wherein the presenter can draw data on the conference window and wherein the drawn data is transferred to each audience member computer system.

25. The presentation system of claim 24 wherein the drawn data is displayed by invoking the function exposed by the application.

26. A conference subsystem for controlling simultaneous execution of an application at multiple computer systems, one computer system designated as a presenter computer system, the other computer systems designated as audience member computer systems, comprising:

a messaging component for sending commands to control the application from the presenter computer system to the audience member computer systems and for receiving commands sent from the presenter computer system to the audience member computer systems;

an automation component for controlling the application to perform behavior of the commands;

a user interface component for displaying output of the application within a conference window, for receiving commands from a presenter, and for directing the automation component to effect the behavior of the command; and wherein the application exposes a function that is invoked by the automation component to perform behavior of the command.

27. The conference subsystem of claim 26 wherein the messaging component and the user interface component are application independent.

28. A conference subsystem for controlling simultaneous execution of an application at multiple computer systems, comprising:

a messaging component for sending commands to control the application from one computer system to the other computer systems and for receiving commands sent from one computer system to the other computer systems;

an automation component for controlling the application to perform behavior of the commands;

a control component for receiving commands from the application and for directing the automation component to effect-the behavior of the command; and wherein the application exposes a function that is invoked by the automation component to perform a behavior of the command.

29. The conference subsystem of claim 28 wherein the messaging component and the control component are application independent.

30. The conference subsystem of claim 28 wherein the automation component is application dependent.

\* \* \* \* \*